United States Patent [19]

Aoki et al.

[11] Patent Number: 5,415,550

[45] Date of Patent: May 16, 1995

[54] RIDING SIMULATION SYSTEM

[75] Inventors: Katsuhito Aoki, Saitama; Yukio Miyamaru, Tokyo; Makoto Makino; Takeshi Masaki, both of Saitama, all of Japan

[73] Assignee: Honda Giken Kogyo Kabushiki Kaisha, Tokyo, Japan

[21] Appl. No.: 95,450

[22] Filed: Jul. 20, 1993

[30] Foreign Application Priority Data

Jul. 20, 1992 [JP] Japan .................................. 4-215466
Oct. 5, 1992 [JP] Japan .................................. 4-266364

[51] Int. Cl.$^6$ .............................................. G09B 9/04
[52] U.S. Cl. ......................................... 434/61; 434/29
[58] Field of Search ...................... 434/61, 62, 69, 29

[56] References Cited

U.S. PATENT DOCUMENTS

| | | | |
|---|---|---|---|
| 3,205,592 | 9/1965 | Wood, Jr. ............................. | 434/69 |
| 3,479,750 | 11/1969 | Swanson . | |
| 3,488,861 | 1/1970 | Jones et al. ............................ | 434/69 |
| 3,833,759 | 9/1974 | Yatabe et al. ......................... | 434/69 |
| 3,895,183 | 7/1975 | Collier .................................. | 348/124 |
| 4,196,528 | 4/1980 | Foerst ................................... | 434/61 |
| 4,464,117 | 8/1984 | Foerst ................................... | 434/67 |
| 4,752,836 | 6/1988 | Blanton et al. ....................... | 358/342 |
| 4,760,388 | 7/1988 | Tatsumi et al. ....................... | 345/1 |
| 4,817,948 | 4/1989 | Simonelli ............................... | 434/65 |
| 4,846,686 | 7/1989 | Adams .................................. | 434/69 |
| 4,887,967 | 12/1989 | Letovsky et al. ..................... | 434/61 |
| 4,978,300 | 12/1990 | Letovsky et al. ..................... | 434/61 |
| 5,006,072 | 4/1991 | Letovsky et al. ..................... | 434/61 |
| 5,015,189 | 5/1991 | Wenzinger, Jr. ...................... | 434/63 |
| 5,090,909 | 7/1992 | Kellar et al. .......................... | 348/121 |
| 5,184,956 | 2/1993 | Langlais et al. ...................... | 434/62 X |
| 5,209,662 | 5/1993 | Fujita et al. .......................... | 434/61 |

FOREIGN PATENT DOCUMENTS

| | | |
|---|---|---|
| 0183497 | 6/1986 | European Pat. Off. . |
| 0406729 | 1/1991 | European Pat. Off. .............. 434/61 |
| 3107311 | 9/1982 | Germany . |
| 3306452 | 8/1984 | Germany . |
| 3925427 | 2/1991 | Germany . |
| 51-24344 | 2/1976 | Japan . |
| 61-154689 | 7/1986 | Japan . |
| 62-1688 | 8/1987 | Japan . |
| 63-249885 | 10/1988 | Japan . |
| 1-232380 | 9/1989 | Japan . |
| 88-06776 | 9/1988 | WIPO . |

OTHER PUBLICATIONS

English language translation of German Official Action, S.N. P 42 21 558.7-35.
English language translation of German Official Action, S.N. P 42 21 602.8-35.
Purpose and Constitution of Japan No. 52-20538.

Primary Examiner—Gene Mancene
Assistant Examiner—Jeffrey A. Smith
Attorney, Agent, or Firm—Lyon & Lyon

[57] ABSTRACT

A riding simulation apparatus comprises a color picture image signal generating apparatus for outputting video image information of a forward field of view of the rider and video image information of the rear of the rider, a display apparatus for receiving the video image information outputted from the color picture image signal generating apparatus, masking a picture image based on the video image information of the rear of the rider and reflecting a video image based on the image information of the forward field of view of the rider on a flat screen provided at a position forwardly of the rider, and a pair of left and right liquid crystal television sets provided at the positions of back mirrors of the simulation motorcycle for receiving the video image information of the rear of the rider and displaying a picture image based on the video image information of the rear of the rider. A running mode selecting controller for selecting a specific running mode, a first control for controlling the behavior of the simulated motorcycle according to a selected specific running mode, and a second control for controlling a picture corresponding to the running mode by changing the contents of the picture according to the selected specific running mode may be included.

11 Claims, 18 Drawing Sheets

FIG. 9A.
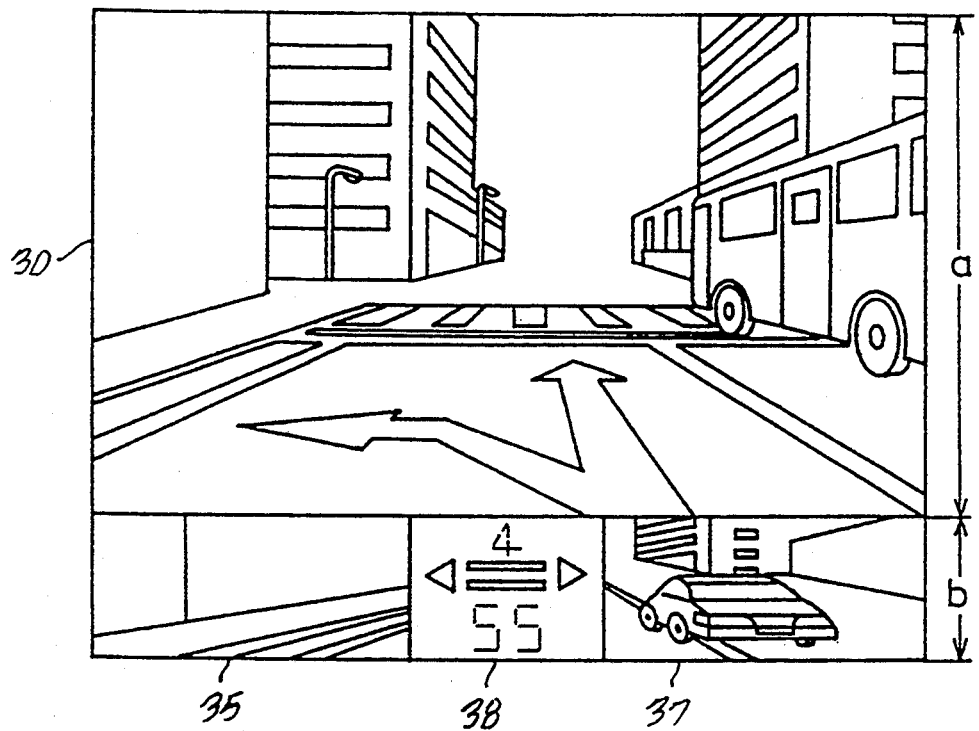
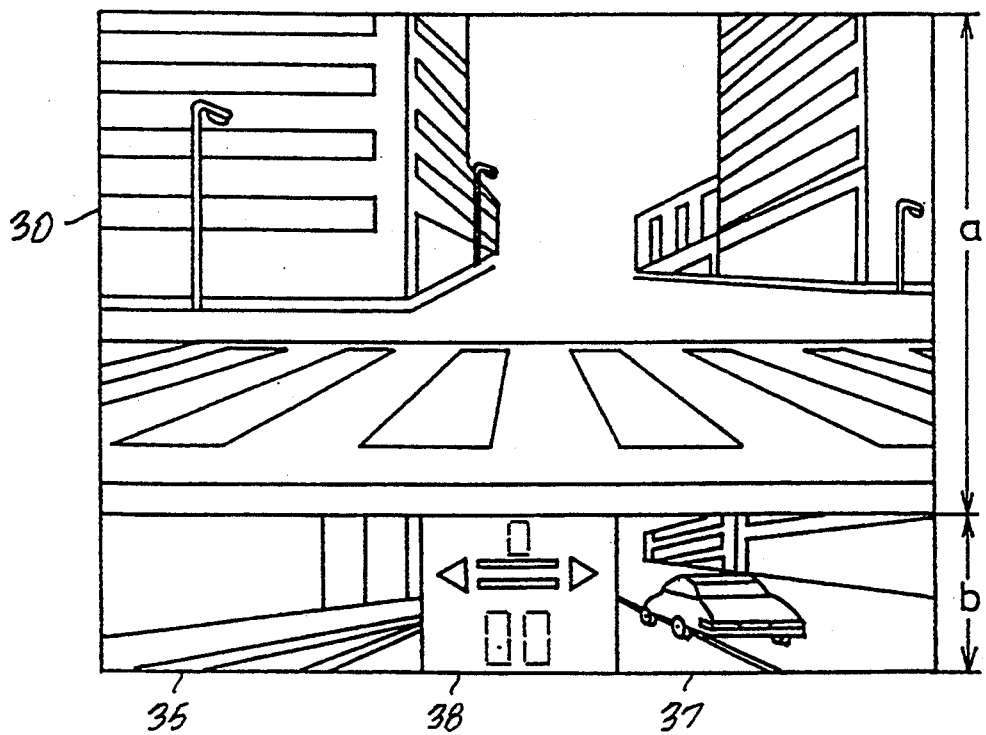
FIG. 9B.

Trigger area $$Vc = \frac{L2}{L1} \cdot Vm$$

$$\left( \begin{array}{l} \text{Use } Vc = (L2/L1) \cdot VmL \\ \text{when } Vm < VmL \end{array} \right)$$

RIDING SIMULATION SYSTEM

BACKGROUND OF THE INVENTION

The field of the present invention is vehicle simulators.

Conventionally, a simulation apparatus is known wherein a simulation motorcycle and a CRT display are combined and the screen of the display is changed in accordance with an operation of a steering handle or an accelerator so as to enjoy riding itself in an actually driving sense or perform training of a riding operation. An improvement of a riding simulation apparatus of this type has been developed wherein a motorcycle of the type can be rolled in order to cause the riding feeling to further approach an actual riding feeling and enhance the feeling of realism upon running. The art of this type is disclosed, for example, in the official gazette of Japanese Patent Laid-Open Application No. 61-154689 or in the official gazette of Japanese Utility Model Laid-Open Application No. 62-1688. A riding simulation apparatus has also been developed which can perform not only rolling but also pitching and yawing and proposed the same as Japanese Patent Laid-Open Application No. 4-51081 "Riding Simulation Apparatus for Motorcycle". See also U.S. Pat. No. 4,887,967.

In such riding simulation apparatus, running is simulated in accordance with a video image on a display screen disposed in an opposing relationship to the simulation motorcycle, and when such apparatus is to be used for training of riding of a motor cycle, there is the necessity of further simulating an actual riding condition. For example, when a riding operation such as changing of a riding way or passing of another vehicle is to be trained, with the conventional apparatus described above, there is a problem that, since a video image corresponding to the riding operation is not reflected on a back mirror of the simulation motorcycle, the training lacks a little in reality. Thus, the latter "Riding Simulation Apparatus for Motorcycle" proposed by the present applicant proposes a solution to the problem.

The riding simulator disclosed in U.S. Pat. No. 4,887,967 displays pictures representing running conditions, taken beforehand to the rider mounting a motorcycle which is moved mechanically. Therefore, the riding simulator is not necessarily able to make the rider experience actual running condition of the motorcycle.

The riding simulators disclosed in Japanese Patent Application Nos. 2-158939 and 2-158940 display pictures reflecting the movement of a simulated motorcycle to a rider mounting the simulated motorcycle, which enables the rider to experience simulated running condition closer to actual running condition.

SUMMARY OF THE INVENTION

The present invention is directed to providing improved front and rear view images for accurate simulation of riding conditions by a riding simulator.

In a first and separate aspect of the present invention, a riding simulation apparatus is provided which simulates running conditions in accordance with the controlled operation of the rider using an image projector which generates a forward view and a rearward view, a forward display apparatus which displays the forward view and masks the rear view and a rearward display apparatus which receives the rearward view. This provides a simplified structure capable of providing front and rear views responsive to operation of the rider.

In a second and separate aspect of the present invention, a riding simulator such as presented in the first and separate aspect of the present invention might additionally include an image receiving apparatus remote from the simulated vehicle which receives all generated simulation views. Such a system may be provided as an instructor monitor.

In a third and separate aspect of the present invention, in addition to the apparatus of the first and separate aspect of the present invention, a first controller may be used for controlling image projection and a second controller may be used to control synchronism of the rear view with the forward view. This allows coordination between views to insure proper simulation.

In a further and separate aspect of the present invention, a front viewing screen and a Fresnel lens may be arranged such that an approved delusion of the ground passing beneath the simulated vehicle may be achieved.

In yet another and separate aspect of the present invention, a simulated vehicle having operative mounts and an image, includes a running mode selector and controllers for the mount and for the image such that various operating modes may be selected. This provides a degree of freedom necessary for offering training which develops the predictive ability necessary for avoiding traffic accidents. Such modes may include a low speed running mode and a high speed running mode. The modes may limit simulated acceleration to zero upon reaching the simulation boundary thereof.

In a further and separate aspect of the present invention, a riding simulation system is provided with images including simulated hazards. A calculator calculates the simulated relative speed of the simulated vehicle to a predetermined simulated hazard presented on the image. In a preferred embodiment thereof the simulated relative speed may be determined using the formula: $V_c = (L2/L1) \cdot V_m$, where $V_c$ is the running speed of said simulated hazard, L1 is the distance between the simulated position of said simulated vehicle and a simulated estimated colliding position between said simulated vehicle and said simulated hazard and L2 is the distance between the position of said simulated hazard and the simulated estimated colliding position.

Accordingly, it is an object of the present invention to provide an improved riding simulation system having enhanced virtual reality. Other and further objects and advantages will appear hereinafter.

BRIEF DESCRIPTION OF THE DRAWINGS

FIG. 9A is a schematic representation of a picture for a normal traffic running mode.

FIG. 9B is a schematic representation of a picture where the mode is just entering an intersection.

DETAILED DESCRIPTION OF THE PREFERRED EMBODIMENTS

Figure 1:
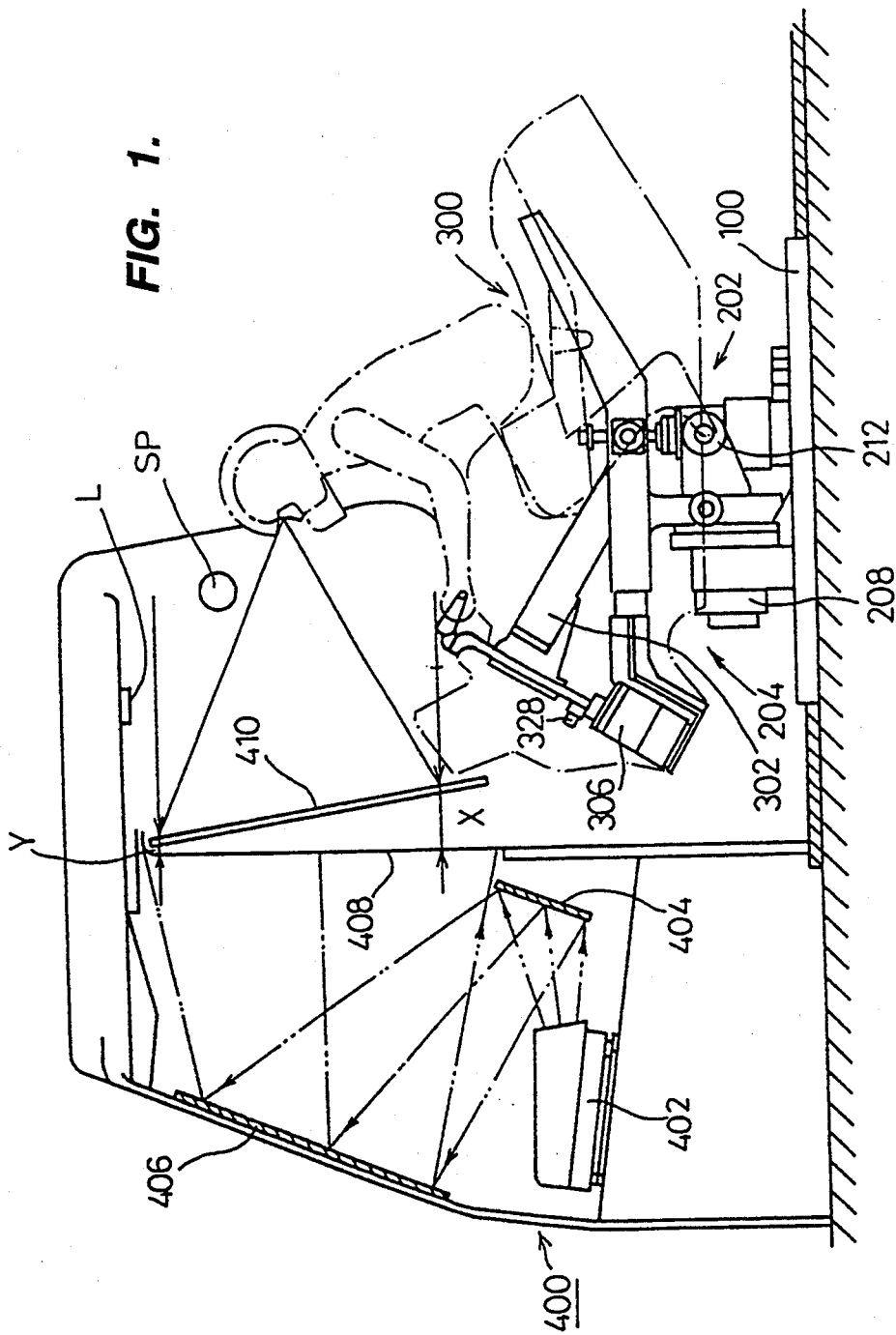
FIG. 1 is an explanatory view showing an arrangement condition of a display apparatus and a simulation motorcycle of a first embodiment.

A video image information of the forward field of view of the rider and video image information of the rear of the rider are outputted from the picture image signal generating apparatus, and at the display apparatus which receives the video image information, a picture image based on the video image information of the rear of the rider is masked and a video image based on the video image information of the forward field of view of the rider is reflected on the screen provided at the position forwardly of the rider while a picture image based on the video image information of the rear of the rider is displayed on the image receiver provided at the position of the back mirror of the simulation motorcycle. In this instance, the picture image signal generating apparatus is required only by one, and the riding simulation apparatus is simple in construction and can be constructed at a low cost.

Further, when the image receiving apparatus is provided, a video image based on the image information of the forward field of view of the rider and another video image based on the video image information of the rear of the rider are displayed on the image receiving apparatus, and watching the video image screen, an instructor can utilize the video images for riding education of the rider.

Further, when the first controlling means and the second controlling means are provided, video image information of the rear of the rider is sent out from the picture image signal generating apparatus to the second controlling means in response to a video image signal outputting indicating signal from the first controlling means, and the video image information is converted into a video image signal by the second controlling means and a video image based on the video image signal is displayed on the image receiver in synchronism with a video image based on video image information of the forward field of, view of the rider. Accordingly, as video image information of the rear of the rider is driven by the second controlling means, and the apparatus is simplified and can be constructed at a low cost.

Furthermore, when the riding simulation apparatus is constructed such that video image information of the forward field of view of the rider and video image information of the rear of the rider are outputted simultaneously from the picture image signal generating apparatus in response to a video image signal outputting indicating signal, since the two video image signals are outputted simultaneously, the riding simulation apparatus can be constructed at a low cost.

Further, when the Fresnel lens is provided, even if the distance between the rider and the screen is short, the eyes can be focused at a long distance and a brighter screen video image can be seen. When the portion of the Fresnel lens corresponding to a lower portion of the video image reflected on the screen is provided at the position displaced toward the rider side, the video image looks as if it runs faster toward the lower portion of the video image, and a condition of actual riding is approached.

Figure 2:
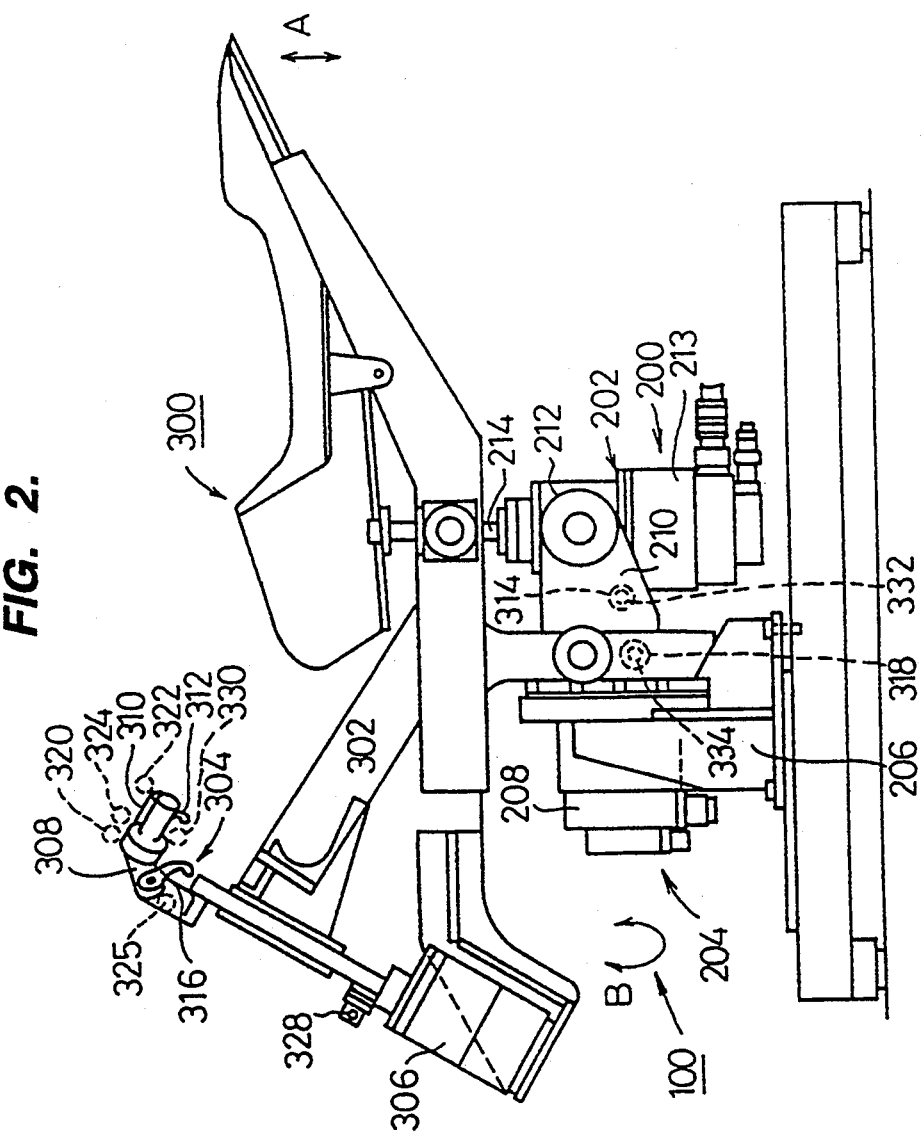
FIG. 2 is an expanded explanatory view of the simulation motorcycle shown in FIG. 1.

Referring to FIGS. 1 and 2, reference 100 denotes a base, and reference numeral 200 denotes a movable mechanism section disposed on the base 100. Reference numeral 300 denotes a simulation motorcycle simulated to an actual motorcycle, and the simulation motorcycle 300 is constituted from a body frame 302, a steering handle mechanism 304, a cowling seat (not shown) covering them, and various sensors disposed on the body frame 302 for detecting a controlling operation of a rider. It is to be noted that details of the sensors will be described hereinbelow.

In order to enhance the feeling of realism, a display apparatus 400 for projecting roads, buildings, trees and so forth thereon is disposed in an opposing relationship to the base 100 so that a riding condition of the simulation motorcycle 300 can be reproduced by sound and video images. The display apparatus 400 is constituted from a video projector 402 for projecting a video image of a running scene or the like, a primary reflecting mirror 404 and a secondary reflecting mirror 406 for reflecting a picture image projected from the video projector 402, a flat screen 408 and a Fresnel lens 410. The primary reflecting mirror 404 is disposed at a position at which it can mask part of a lower portion of a picture image projected from the video projector 402. A video image corresponding to a running condition can be reproduced by way of the Fresnel lens 410. Further, in the display apparatus 400, a pair of loudspeakers SP for enhancing the stereo acoustic effect of the left and right R/L channels upon the rider, a spotlight L for performing lighting upon riding, and an air blowing fan (not shown) for providing a running feeling to the rider are provided at predetermined locations.

Subsequently, general construction of the movable mechanism section 200 will be described.

The movable mechanism section 200 is disposed for the simulation motorcycle 300 and provides pitching movement (in the direction indicated by an arrow mark A in FIG. 2) and rolling movement (in the direction indicated by an arrow mark B in FIG. 2) to the simulation motorcycle 300 in response to outputs of the various sensors for detecting a riding operation of the rider. Such movable mechanism section 200 includes a pitching movable mechanism 202 and a rolling movable mechanism 204. The pitching movable mechanism 202 engages the body frame 302 constituting the simulation motorcycle 300 to move the body frame 302 upwardly and downwardly to provide pitching movement. The rolling movable mechanism 204 tilts the simulation motorcycle 300 around a rolling shaft together with the pitch movable mechanism 202 to provide rolling movement. Particularly, a first supporting member 206 is provided on the base 100, and a first motor 208 constituting the rolling movable mechanism 204 is held on the first supporting member 206. A rotary drive shaft not shown of the first motor 208 holds a second supporting member 210 in the form of an arm thereon, and further, the second supporting member 210 holds a second motor 212 thereon. A hydraulic cylinder 213 is coupled to a rotary drive shaft (not shown) of the second motor 212. A cylinder rod 214 which extends upwardly from the hydraulic cylinder 213 supports the body frame 302 in a floating condition.

The body frame 302 further holds a third motor 306 at an end portion thereof, and the third motor 306 is connected at a rotary drive shaft thereof to a steering handle 308. The third motor 306 is a steering handle movable motor for providing, upon operation of the steering handle 308 by the rider, a reactive force corresponding to the operating force, and a steering handle operating feeling near to that of an actual operation is provided by this.

The simulation motorcycle 300 is simulated to an actual motorcycle and is provided with, in order to detect an operating condition of the rider, in addition to the steering handle 308, a throttle lever 310, brakes 312 and 314 for front and rear wheels, a clutch lever 316, a transmission 318 for a gear shifting operation, a headlamp switch 320, a start switch 322 and so forth, and the various sensors for detecting operations of them and displacement of the weight of the rider are provided.

As those sensors, a throttle lever opening sensor 324, a clutch lever sensor 325, a steering handle torque sensor 328, a front brake pressure sensor 330 and a rear brake pressure sensor 332, and a gear position sensor 334 are provided.

Accordingly, if the rider operates, then a signal is outputted from some of the sensors and inputted to a computer, and a picture image of the display apparatus 400 is changed by the computer while the first to third motors 208, 212 and 306 and the hydraulic cylinder 213 are controlled to be energized and deenergized, whereby a behavior which can be felt similarly as with an actual motorcycle can be reproduced.

Here, the display apparatus 400 will be described. As described above, the rider is watching the flat screen 408, on which a video image is projected, by way of the Fresnel lens 410 from the position of the visual point in FIG. 1. In this instance, the distance X is greater than the distance Y with reference to the flat screen 408. With such construction, if the distance between the visual point of the rider and the flat screen 408 is short, the focus can be provided at a long distance through the Fresnel lens 410.

Consequently, a video image projected in such a manner as if it exists at a long distance can be visually discerned by the rider with a feeling of distance near to that of an actual distance. Besides, there is an advantage that, since light scattered in all directions from the flat screen 408 is converged to the direction of the line of sight of the rider by the Fresnel lens 410, the video image can look further brightly.

Furthermore, since the Fresnel lens 410 is disposed in an inclined relationship to the flat screen 408, the video image is expanded toward the lower portion. Consequently, when the rider discerns the video image in the sense of running on a road, it can be felt that, at the enlarged portion, the video image runs faster. As a result, the vehicle speed feeling is enhanced, and a simulation experience can be had in the sense near to that of riding of an actual vehicle.

Figure 3:
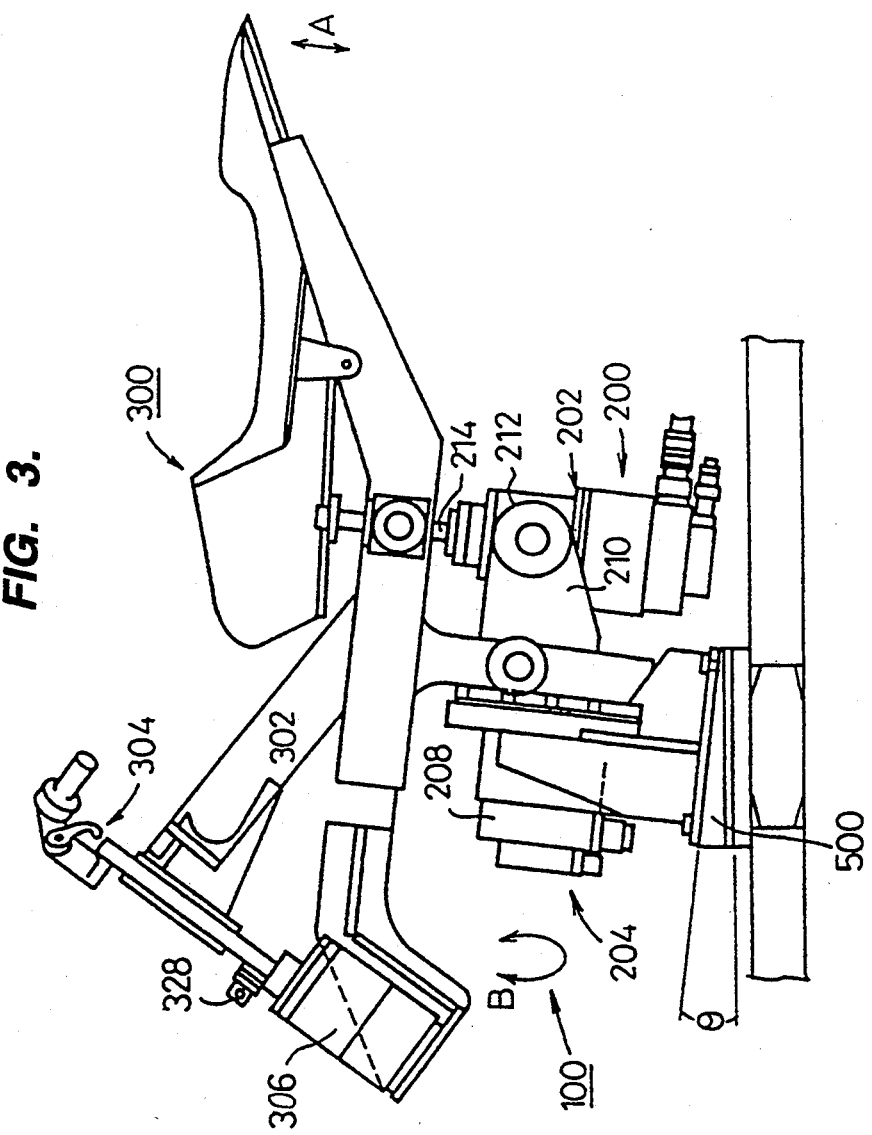
FIG. 3 is an explanatory view, partly omitted, of a second embodiment.

In this FIG. 3, a spacer 500 for providing an inclination by $\theta$ is interposed in the movable mechanism section 200 so that a yawing feeling can be obtained.

By inserting the spacer 500 in this manner, the rider on the body frame 302 will always look at the inner side with respect to a tangential direction of the wheel, and a feeling as if yawing is taking place can be experienced.

Thus, before simulation control by the computer is described in detail, general operation of the present invention will be first described briefly.

When, for example, acceleration or deceleration is performed by operation of the accelerator or by operation of the brake, the body frame 302 is moved forwardly or backwardly by the second motor 212 so that the simulation motorcycle 300 is moved. By this, the simulation motorcycle 300 is inclined such that it rises at a front portion or a rear portion thereof so that an acceleration or deceleration feeling is provided to the rider. Further, when the display picture image comes to a corner portion and the rider performs displacement of the weight thereof, the rolling shaft not shown is rotated by the first motor 208 to tilt the simulation motorcycle 300 in a sideward direction. Thereupon, the hydraulic cylinder 213 is energized in accordance with the necessity so that the body frame 302 is raised in its tilting direction under the elongating action of the cylinder rod 214. Consequently, a turning feeding upon cornering is temporarily experienced by the rider.

Subsequently, construction of a displaying and controlling system in one embodiment of the present invention will be described.

Figure 4:
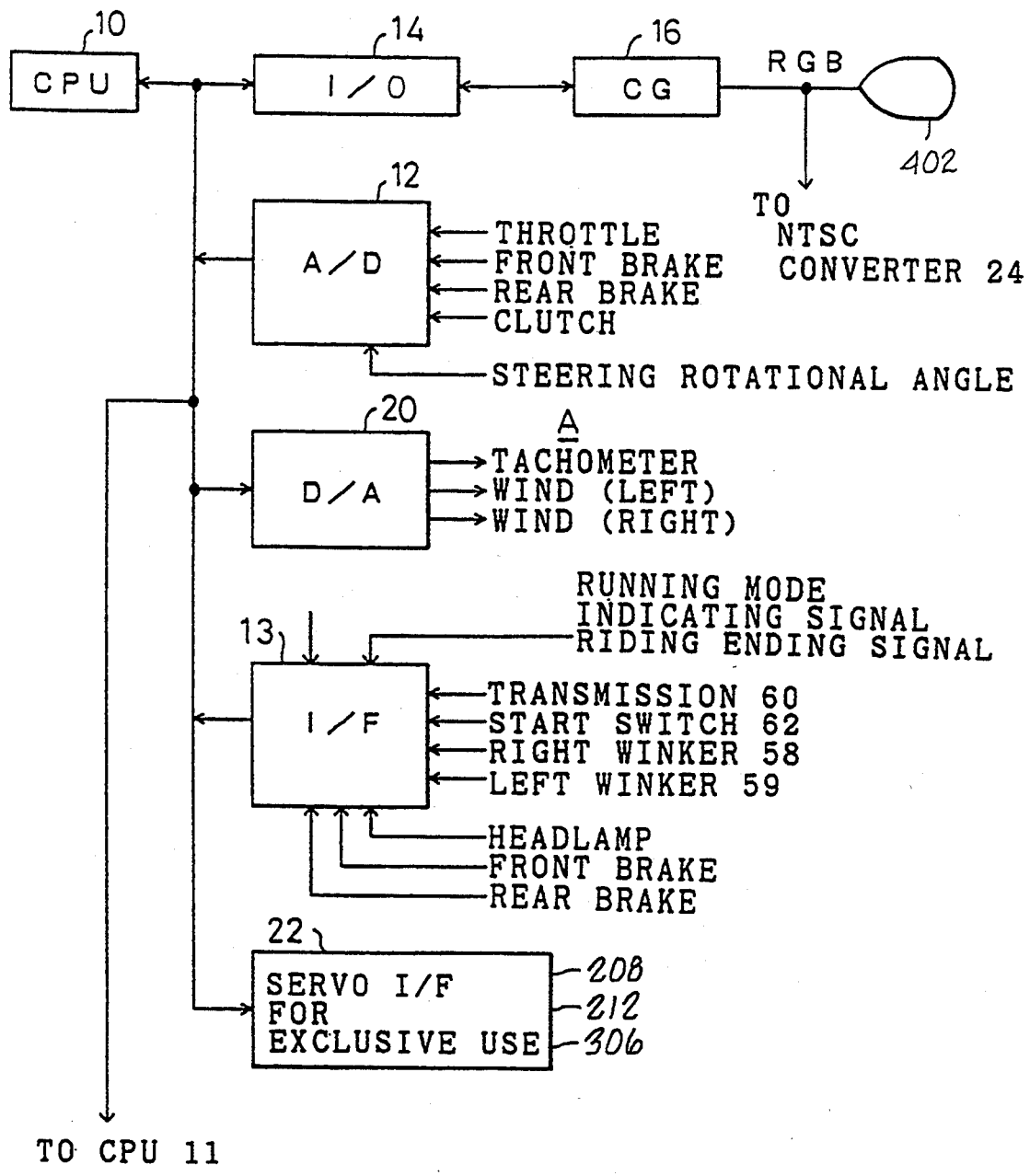
FIG. 4 is a block diagram showing construction of a displaying and controlling system of the first embodiment.
Figure 5:
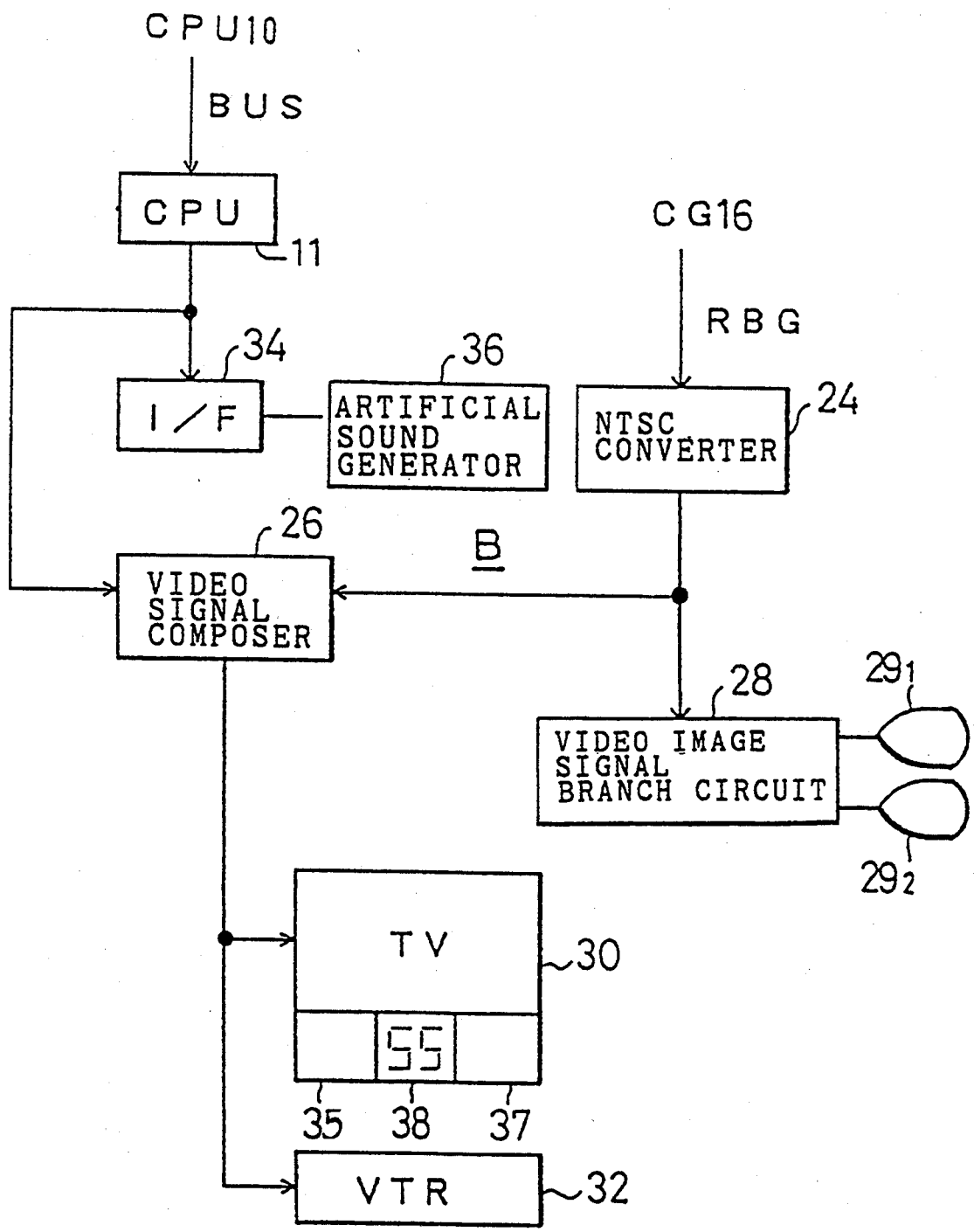
FIG. 5 is a block diagram showing construction of the displaying and controlling system of the first embodiment.

FIGS. 4 and 5 are block diagrams showing construction of the displaying and controlling system of the present one embodiment.

The displaying and controlling system of the present one embodiment includes a display controlling section A for performing control of the display of the field of view as viewed from the rider on the simulation motorcycle (hereinafter referred to as self motorcycle) simulated and the display of the self motorcycle based on running operation of the rider, and another display controlling section B for cooperating with the display controlling section A to perform control of the display for an instructor.

The display controlling section A includes a CPU 10 connected to another CPU 11 by way of a bus, a color picture image signal generating apparatus 16 for receiving display indicating information of a field of view as viewed from the rider based on information from the CPU 10 by way of an input/output interface 14 and sending out three primary color signals of red, green and blue for the display of video images of the front and the rear of the self motorcycle as viewed from the rider to the video projector 402, an analog to digital converting apparatus 12 for converting an operation analog signal based on a running operation of the rider into digital data and sending out the digital data to the CPU 10, a digital to analog converting apparatus 20 for converting self motorcycle running speed information outputted from the CPU 10 and self motorcycle sound information based on running into analog signals, an input interface 13 for receiving an on/off signal by operation of the rider and a riding ending indicating signal operated by an instructor and sending out corresponding information to the CPU 10, and a servo signal generating interface 22 for receiving a motor controlling signal outputted from the CPU 10 and outputting signals for controlling the first to third motors 208, 212 and 306.

The CPU 10 executes input/output processing, calculation of a self motorcycle running position, a direction and a self motorcycle posture from signals based on a running operation of the rider, display control, control of the posture of the self motorcycle, control of a condition of another vehicle, riding scoring control and so forth.

Operation analog signals to be inputted to the analog to digital converting apparatus 12 are a steering rotational angle signal of the steering handle 308, a throttle grip rotational position signal, a front brake lever position signal, a rear brake position signal and a clutch change-over position signal and are detected, for example, by position sensors 334 which operate in response to the steering handle 308, the clutch lever 316, the front wheel brake 312 and the rear wheel brake 314. Further, they may be detected by means of rotary encoders, and in this instance, they can be inputted to the input interface 13 omitting the analog to digital converting apparatus 12.

Signals to be inputted to the input interface 13 are a running mode indicating signal, a start signal of the self motorcycle, a transmission set speed number indicating signal of the first or second speed or the like, left and right winker blinking/extinguishing indicating signals and a riding ending indicating signal, and outputs from corresponding switch means such as a running mode indicating switch, a start switch 62, a transmission setting detecting switch 60, left and right winker switches 58 and 59, front and rear brake operating switches, a headlamp switch 320 and a riding indicating switch to be operated by an instructor are inputted.

The color picture image signal generating apparatus 16 includes an external storage apparatus in which a plurality of color three primary color picture image signal data corresponding to a video image of the forward field of view of the rider, that is, a video image of the surroundings forwardly of the self motorcycle are stored corresponding to running modes and a plurality of color three primary color picture image signal data corresponding to a video image including a condition of another vehicle in the rear of the self motorcycle reflected on back mirrors are stored corresponding to the running modes, and reads out color three primary color picture image signal data based on information of a running mode outputted from the CPU 10 and inputted by way of the interface 14, processes the data and causes a corresponding picture image to be displayed on picture image displaying means.

The servo signal generating interface 22 receives a controlling signal from the CPU 10, controls driving of the first to third motors 208, 212 and 306 to control the posture of the self motorcycle and performs control of a reactive force upon operation of the steering handle 308.

The display controlling section B includes the CPU 11 connected to the CPU 10 by way of the bus, an artificial sound generator 36 for receiving an artificial sound controlling signal by way of an interface 34 and driving the loudspeakers SP to generate artificial sounds of the surroundings of the running position of the self motorcycle, an NTSC converter 24 for converting three primary color signal data outputted from the color picture image signal generating apparatus 16 into a color television signal of the NTSC system, a video signal composer 26 for composing a video signal based on a transmission set speed displaying signal outputted from the CPU 11, left and right winker blinking indicting signals, front and rear wheel brake operation indicating signals and self motorcycle running speed information and a color television signal outputted from the NTSC converter 24, and a video signal branch circuit 28 for branching a color television signal portion to be reflected on the back mirrors from within a color television signal outputted from the NTSC converter 24.

A color television signal composed at the video signal composer 26 is supplied to a television set 30, on which a video image of the field of view as viewed from the rider is displayed, a speed of the self motorcycle, a transmission set speed, conditions of the left and right winkers and conditions of the front and rear brakes are displayed at a speed displaying portion 38 provided at a lower central portion of the video image display, and video images reflected on the back mirrors are displayed at a left displaying portion 35 and a right displaying portion 37 provided on the left and right of the speed displaying portion 38. Further, a color television signal corresponding to a right side portion from within the color television signal portion branched by the video image signal branch circuit 28 is supplied to a liquid crystal television set $29_1$ provided at the position of the right back mirror while a color television signal corresponding to a left side portion from within the video image signal portion branched by the video image signal branch circuit 28 is supplied to another liquid crystal television set $29_2$ provided at the position of the left back mirror so as to cause them to display video images of the rear of the self motorcycle.

Meanwhile, an output color television signal from the video signal composer 26 is supplied to and recorded by a video image signal recording apparatus 32.

It is to be noted that an artificial sound signal corresponding to a speed of the self motorcycle may be included in an artificial audio controlling signal so that the artificial sound generator 36 may be driven to generate artificial sound in accordance with the speed of the self motorcycle. When this construction is employed, the necessity of outputting self motorcycle sound information from the digital to analog converting apparatus 20 is eliminated.

Figure 8:
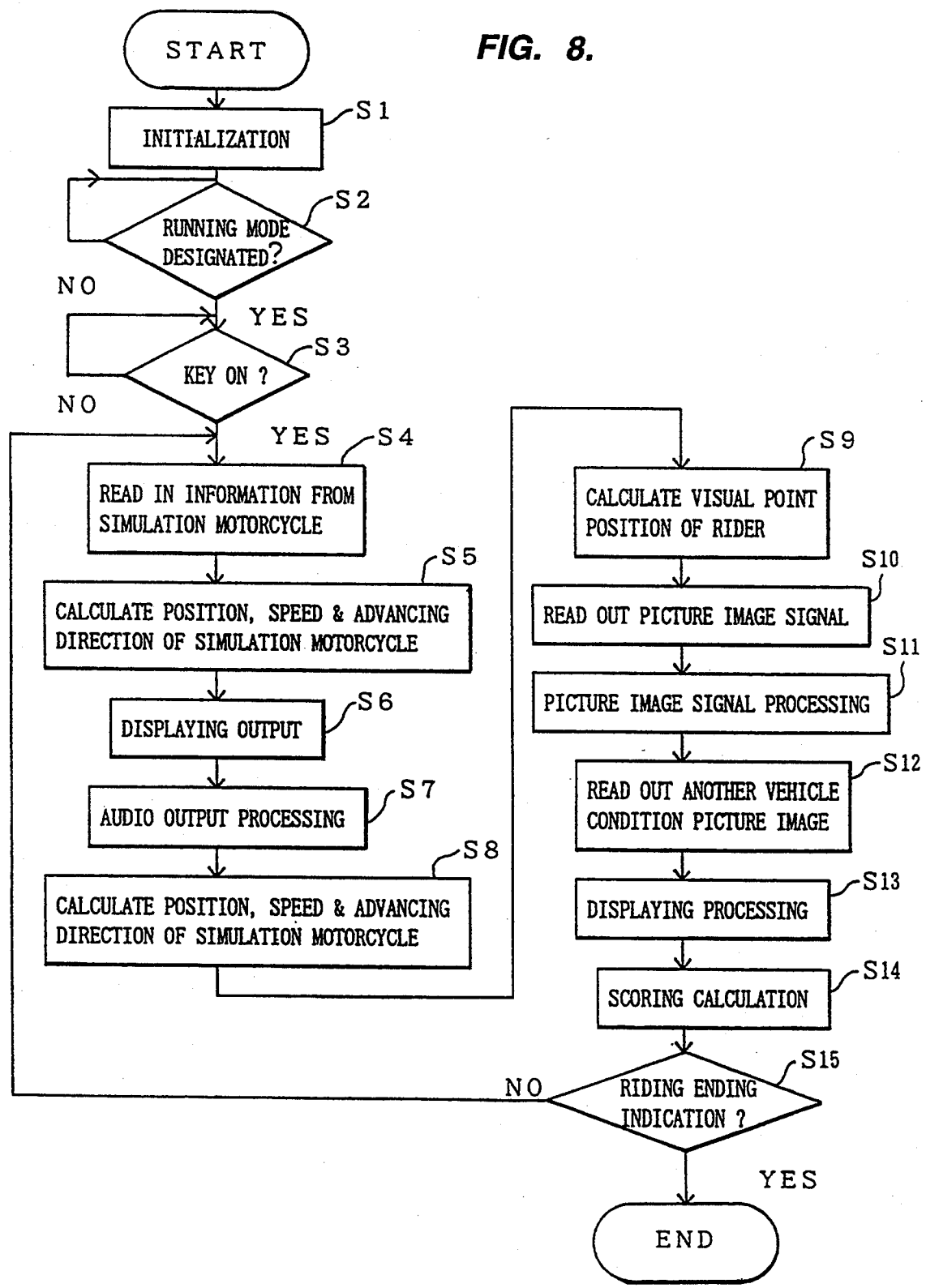
FIG. 8 is a flow chart for use for explanation of an action of the first embodiment.

Looking to FIG. 8, after the program is started, initialization is executed (step S1), and an output from the input interface 13 is read in and it is waited that designation of a running mode is performed (step S2). The running mode may be, for example, an ordinary road running mode, a running mode for traffic in confusion, a running mode for a dangerous condition or the like, and color picture image three primary color signal data of the field of view and color picture image three primary color data including a condition of another vehicle in the rear of the self motorcycle are stored corresponding to the running modes in the external storage apparatus of the color picture image signal generator 16. Further, designation of a running mode is selected by an instructor.

After designation of a running mode is performed, color picture image three primary color signal data of the field of view and color picture image three primary color data including a condition of another vehicle in the rear of the self motorcycle corresponding to the running mode are transferred once to a RAM in the color picture image signal generator 16. An output from the input interface 13 is read in and it is waited that a start signal is inputted (step S3). After a start signal is inputted, an output from the analog to digital converting apparatus 12 and an output from the input interface 13 are read in and stored once into the storage apparatus of the CPU 10 (step S4).

A position, a speed and an advancing direction of the self motorcycle are calculated based on a steering rotational angle signal, a throttle grip rotational position signal, a front brake lever position signal and a rear brake position signal and a clutch position signal read in (step S5), and self motorcycle sound information based on the thus calculated speed information is read out from the storage means and converted into analog signals, in response to which the left and right loudspeakers SP are driven so that self motorcycle sound is reproduced (step S6). Then, self motorcycle running speed information based on the calculated speed is read out from the storage means and converted into an analog signal, and a speedometer provided on the self motorcycle is driven in response to the analog signal so that a self motorcycle speed is displayed (step S7).

Subsequently, a magnitude of a steering reactive force and a posture of the self motorcycle, that is, a rolling amount and a pitching amount of the self motorcycle, are calculated from the signals read in at step S4 (step S8), and signals individually corresponding to the thus calculated steering reactive force magnitude, rolling amount and pitching amount are sent out to the servo signal generating interface 22 and driving of the third motor 306, the first motor 208 and the second motor 212 is controlled so that a reactive force to an operation of the steering handle of the self motorcycle is provided and rolling and pitching are provided to the self motorcycle.

Accordingly, the rider is required to exert the same force for operation of the steering handle as that when the rider rides on an actual motorcycle, and same rolling and pitching feelings those as when the rider rides on an actual motorcycle are provided to the rider. Further, the rider hears same sound of a wind as that when the rider rides on an actual motorcycle.

A position of the visual point of the rider is calculated based on the results of the calculations at steps S5 and S8 (step S9), and the running mode information based on the designated running mode and the visual point position information thus calculated are sent out by way of the input/output interface 14 to the color picture image signal generating apparatus 16, and the color picture image three primary color data corresponding to the video image forwardly of the self motorcycle and the color picture image three primary color signal data corresponding to the video images reflected on the back mirrors transferred to the RAM of the color picture image signal generating apparatus 16 in accordance with the running mode are successively read out (step S10), whereafter processing corresponding to the calculated visual point position information is performed (steps S11 and S12).

In the processing corresponding to the visual point position information, processing of, for example, controlling rotation of coordinates of the display in accordance with pitching, rolling and yawing (yaw) angles of the self motorcycle and controlling the reading out rate of the color picture image three primary color signal data from the RAM of the color picture image signal generating apparatus 16 in accordance with the running speed of the self motorcycle to raise the changing over rate of the display screen.

Subsequently, displaying processing to compose the color picture image data processed at steps S11 and S12 is executed, and a result of the processing is outputted to the video projector 402. A signal to be outputted to the video projector 402 is a three primary color signal (step S13).

The three primary color signal is a signal which makes a picture image which eliminates, for example, a central portion of a b portion shown in FIG. 9(A), that is, the speed displaying portion 38 of the television set 30, and when the signal is received, a display wherein the central portion of the b portion shown in FIG. 9(A) is eliminated is displayed on the video projector 402. The display video image is reflected by the primary reflecting mirror 404 and the secondary reflecting mirror 406 and projected onto the flat screen 408 disposed substantially perpendicularly to the line of sight of the rider. Midway of the projection, a video image of the b portion of FIG. 9(A), that is, a video image of the speed displaying portion 38 and video images of the left displaying portion 35 and the right displaying portion 37 of the television set 30, are masked optically.

Accordingly, an a portion of FIG. 9(A) is reflected on the flat screen 408. The rider will see the video image through the Fresnel lens 410. Here, since the rider watches the video image through the Fresnel lens 410, even if the distance between the visual point and the flat screen 408 is short, the eyes can be focused at a long distance. As a result, the rider will see the remote scene with a feeling of distance near to that of an actual distance.

Further, since light scattered in all directions from the face of the flat screen 408 is converged to the direction of the line of sight of the rider by the Fresnel lens 410, a further bright video image can be seen. Since the Fresnel lens 410 is disposed in a condition wherein the lower portion side of the video image is drawn to the rider side, the video image is expanded toward the lower portion. Accordingly, the expanded portion looks as if it runs faster, and while the visual point of the rider is at a long distance, the video image at the front lower portion runs fast comparing with the video image at the upper portion, which provides a feeling near to a feeling of actual riding.

Further, in this instance, the video image of the surroundings in front of the self motorcycle reflected on the flat screen 408, that is, the video image of the forward field of view of the rider, is processed in a condition in which it is viewed from the visual point of the rider, and when the posture of the self motorcycle changes, a change such as a turning movement takes place in response to the posture. Consequently, a condition of the surroundings same as that of a condition during riding with an actual motorcycle will be observed.

Simultaneously, artificial sound is reproduced from the artificial sound generator 36 in accordance with an artificial audio controlling signal outputted from the CPU 11 so that artificial sound corresponding to the running mode of the rider, that is, sound around the running position, is sounded.

Further, color picture image three primary color signal data outputted from the color picture image signal generating apparatus 16 and received by the NTSC converter 24 are converted into a color television signal by the NTSC converter 24, and the video image signal based on the transmission set speed signal, left and right winker blinking indicating signals, front and rear wheel brake operation indicating signals and self motorcycle running speed information outputted from the CPU 11 and the color television signal converted by the NTSC converter 24 are composed by the video signal composer 26.

The color television signal composed by the video signal composer 26 is supplied to the television set 30, and a video image based on the color television signal is reflected on the television set 30. If an example of such video image is illustrated in the case wherein the ordinary road running mode is designated, then this is such as shown in FIG. 9(A).

Accordingly, on the television set 30, a video image of the field of view as viewed from the rider is displayed at the a portion and other video images reflected on the left and right back mirrors and including another vehicle are reflected at the b portion, and a self motorcycle speed, a transmission set speed, a blinking or extinction display of the left or right winker, operation conditions of the front and rear wheel brakes are displayed at the speed displaying portion 38 positioned between the left and right video images of the b portion. Accordingly, the instructor who is watching the video image on the television set 30 recognizes the riding condition of the rider.

The color television signal converted by the NTSC converter 24 is supplied also to the video image signal branch circuit 28, and color television signal portions to be reflected on the back mirrors from within the color television signal outputted from the NTSC converter 24 are branched at the video image signal branch circuit 28 and are individually supplied to the liquid crystal television sets 29₁ and 29₂.

Thus, video signals indicating the condition in the rear of the self motorcycle reflected on the left and right back mirrors are reflected on the liquid crystal television receivers 29₁ and 29₂. However, since the liquid crystal television receivers 29₁ and 29₂ are provided at the positions of the back mirrors of the self motorcycle in place of the back mirrors of the self motor-cycle, the rider can see the video image in the rear of the self motorcycle which changes as the self motorcycle runs, which is equivalent to seeing video images of the back mirrors.

It is to be noted that the output of the video signal composer 26 is supplied also to the video image signal recording apparatus 32 and is recorded by the video image signal recording apparatus 32. Accordingly, after completion of riding, problems of the riding method can be explained to the rider while showing the reproduced picture image.

Subsequently to step S13, calculation of scoring of the riding is executed (step S14), and the program is executed repetitively again beginning with step S4 until a riding ending indication is provided. The display of the television set 30 at a point of time when the self motorcycle advances to a crossing during such execution is such as shown in FIG. 9(B).

The riding scoring calculation at step S14 is executed in accordance with a result of comparison wherein riding operations of the rider with regard to predetermined items such as a distance between the self motorcycle and another vehicle, a brake operating position and a riding operation at a crossing are compared with predetermined standards.

Subsequently to the calculation, it is checked whether or not a running ending indication has been provided, and the program is executed repetitively beginning with step 4 until an end of running indication is provided (step S15). When a running ending indication is provided, the program comes to an end.

Meanwhile, the processing when another running mode is designated is similar, and the dangerous condition running mode is a running mode wherein the self motorcycle may collide with another vehicle or approach another vehicle very closely.

It is to be noted that, in the one embodiment described above, the case is illustrated wherein a plurality of color picture image three primary color signal data corresponding to a video image of the surroundings in front of the self motorcycle are stored in the color picture image signal generating apparatus 16 corresponding to the running modes and the external storage apparatus is provided in which a plurality of color three primary color picture image signal data corresponding to video images reflected on the back mirrors and including a condition of another vehicle in the rear of the self motorcycle are stored corresponding to the running modes. By this arrangement, the construction can be obtained with the single color picture image signal generator 16 and is simplified, and also calculation can be performed simultaneously and also the accuracy in calculation is enhanced.

In place of this, a plurality of color three primary color picture image signal data corresponding to video images reflected on the back mirrors and including a condition of another vehicle in the rear of the self motorcycle are stored in the storage apparatus of the CPU 11 corresponding to the running modes so that they may be read out suitably.

Alternatively, color three primary color picture image signal data corresponding to video images outputted from the color picture image signal generating apparatus 16 and including a condition of another vehicle in the rear of the self motorcycle may be inputted by way of the interface 14 also to the CPU 11 so that they may be converted into a color television signal of the NTSC system under the control of the CPU 11 and outputted as a video image signal composed with information to be displayed on the speed displaying portion 38 to the video signal composer 26.

Figure 6:
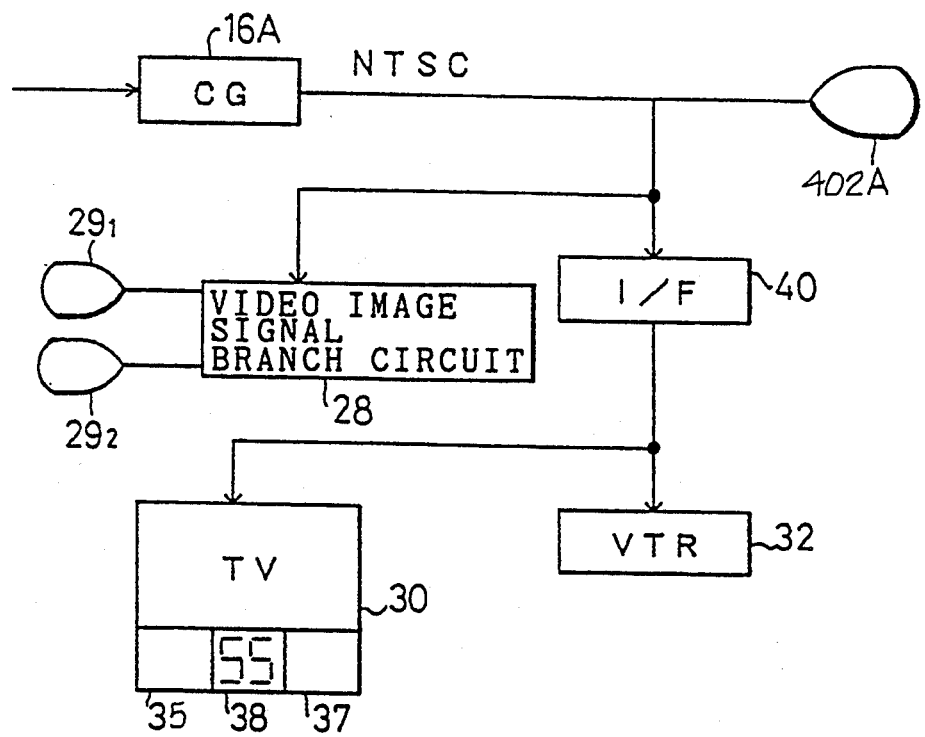
FIG. 6 is a block diagram showing construction of a principal portion of a displaying and controlling system of a first modification.

A first modification is described in FIG. 6, a block diagram showing construction of a principal portion of the present first modification. A color picture image signal generating apparatus 16A for outputting a color television signal of the NTSC system is employed in place of the color picture image signal generating apparatus 16, and a video projector 402A for receiving a color television signal and displaying a video image thereon is employed in place of the video projector 402. The other construction is the same as that of the one embodiment described above.

Accordingly, the NTSC converter 24 of the one embodiment described above can be omitted, and a color television signal outputted from the color picture image signal generating apparatus 16A is supplied to the television receiver 30 and the video image signal recording apparatus 32 by way of the interface 40.

As a result, a video image based on the color television signal outputted from the color picture image signal generating apparatus 16A is displayed on the projector 402A, displayed on the television set 30 and recorded by the video image signal recording apparatus 32. The other action is the same as that of the one embodiment described above.

Figure 7:
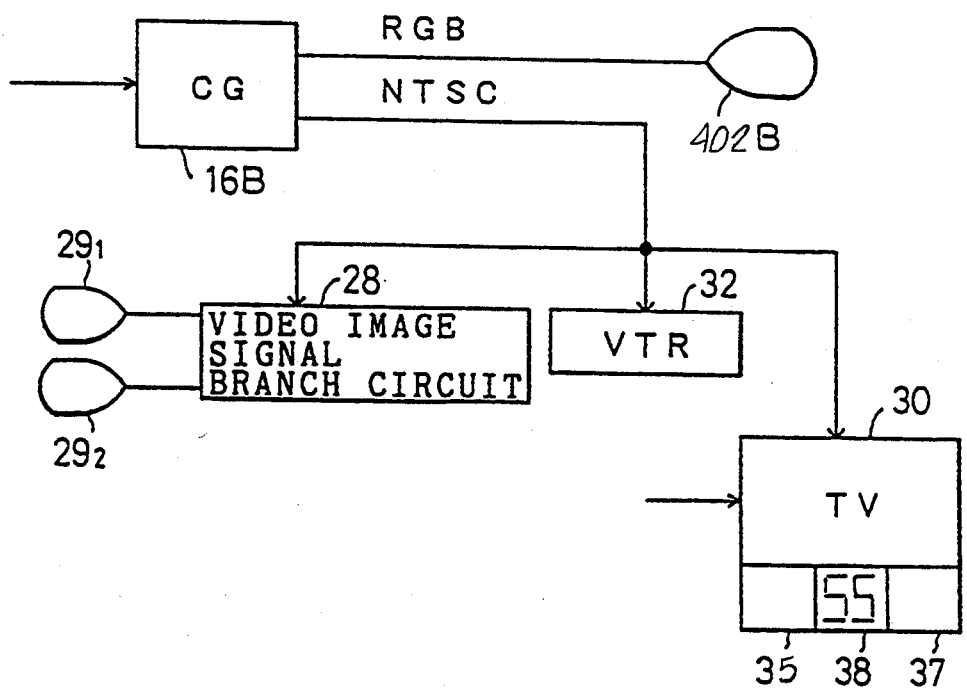
FIG. 7 is a block diagram showing construction of a principal portion of a displaying and controlling system of a second modification.

A second modification is described in FIG. 7, a block diagram showing construction of a principal portion of the present second modification. A color picture image signal generating apparatus 16B for outputting three primary color picture image signal data corresponding to a same video image and a color television signal of the NTSC system is employed in place of the color picture image signal generating apparatus 16, and color three primary color picture image signal data outputted from the color picture image signal generating apparatus 16B are supplied to the video projector 402B while a color television signal outputted from the color picture image signal generating apparatus 16B is supplied to the video signal branch circuit 28, the television set 30 and the video image signal recording apparatus 32. The other construction is the same as that of the one embodiment described above.

Accordingly, the NTSC converter 24 of the one embodiment described above can be omitted. As a result of such construction, a video image based on color three primary color signal data outputted from the color picture image signal generating apparatus 16B is displayed on the video projector 402, and a video signal based on a color television signal outputted from the color picture image signal generating apparatus 16B is displayed on the television set 30 and recorded by the video image signal recording apparatus 32. The other action is the same as that of the one embodiment described above.

While, in the one embodiment and the first and second modifications described above, the examples are shown wherein artificial sound is reproduced by the artificial sound generator 36 in accordance with an artificial audio controlling signal outputted from the CPU 11 so that artificial sound corresponding to the running mode, that is, sound in the surroundings of the running position, is sounded to the rider, a game machine for home use may be employed in place of the interface 34 and the artificial sound generator 36 so that an output from the CPU 11 is supplied to the game machine for home use so as to make use of output sound from the game machine-for domestic use. With such construction, the apparatus for the reproduction of artificial sound can be simplified.

Further, by using a CD-ROM as the external storage apparatus provided for the color picture image signal generating apparatus 16, 16A or 16B, a large amount of data such as a picture image data base, behavior control parameters for the vehicle body of the self motorcycle, running course guidance announce data can be stored onto a disk, and besides, a change of a video image, sound and a behavior to be used with the simulation apparatus can be performed readily by exchange of the disk and the change can be performed readily by the rider. Furthermore, a change-over of a scene in which the rider may feel a "chill" during riding or a scene in which the rider may feel "startled" during riding is facilitated.

Further, in a scene of such a condition wherein the self motorcycle is to turn a crossing, a yawing angle of the self motorcycle is calculated, and when the yawing angle of the self motorcycle is higher than a predetermined value in the displaying processing at step S13, the change-over of the screen of the displayed video image is performed at a rate twice that of an ordinary case, for example, while the changing over rate in an ordinary case is 30 frames/second, the changing over rate when the yawing angle is higher than the predetermined value is set to 60 frames/second. By this means, in such a case wherein the self motorcycle turns a crossing, even if the screen shakes in the direction of the yawing angle, deterioration of the picture quality can be prevented.

As described so far, since a picture image based on video image information of the rear of a rider is masked and a video image based on video image information of a forward field of view of the rider is reflected on a screen provided at a position forwardly of the rider while picture images based on the video image information of the rear of the rider are displayed on image receivers provided at positions of back mirrors of a simulation motorcycle, the picture image signal generating is required only by one, and there is an effect that the riding simulation apparatus is simple in construction and can be constructed at a low cost.

Further, there is an effect that video images of the rear are reflected at the positions of the back mirrors, which is similar to that of the case of an actual motorcycle.

Meanwhile, when an image receiving apparatus is provided, a video image based on video information of the forward field of view of the rider and another video image based on video image information of the rear of the rider are displayed on the image receiving apparatus, and also there is an effect that riding education of the rider can be performed effectively by an instructor watching the screen of the video image.

Further, when first controlling means and second controlling means are provided, video image information of the rear of the rider to be displayed on the image receiver is driven by the second controlling means, and there is an effect that the apparatus is simplified and can be constructed at a low cost.

Furthermore, when video image information of the forward field of view of the rider and video image information of the rear of the rider are outputted simultaneously from the picture image signal generating apparatus in response to a video image signal outputting indicating signal, since the two video image signals are outputted simultaneously, there is an effect that the apparatus can be constructed at a low cost.

Further, when a Fresnel lens is provided, in addition to an effect that, even if the distance between the rider and the screen is short, the eyes can be focused at a long distance, there is another effect that a further bright screen video image can be seen.

Further, when a portion of the Fresnel lens corresponding to a lower portion of a video image reflected on the screen is provided at a position displaced toward the rider side, the video image can be seen as if it runs faster toward the lower portion of the image, and there is an effect that a condition upon actual running is approached.

Several other features are here described. A riding simulator including a running mode selector enables the rider to experience special maneuvering operations for simulation in a specified running mode, such as a low-speed or high-speed running mode in addition to simulating the actual running condition of a motorcycle to realize excellent training effects which cannot be realized by training through actual running. A running speed limiter may be used to limit the highest running speed forcibly to a predetermined upper limiting running speed to a predetermined lower limiting running speed to realize a specific running condition forcibly and to make the rider experience the specific running condition. A riding simulator may include a sound generator to generate a sound when the simulated motorcycle enters a predetermined area to warn the rider, whereby an appropriate advice is given to the rider, for example, when the simulated motorcycle is about to enter the intersection in the picture to enhance the effect of training. A riding simulator having a relative speed calculator may be used to simulate a dangerous state in which the simulated vehicle collides against or approaches the nearby vehicle to make the rider experience a frightening condition which may lead to a traffic accident. The simulation of such a dangerous state is effective for training the rider for the observation of the running condition that will lead to collision and actions to avoid collision. The relative speed calculator may simulate a nearby vehicle which is approached by the simulated motorcycle or against which the simulated motorcycle may collide by using a predetermined expression. Thus, the riding simulator simulates a state in which the simulated motorcycle may collide against or approaches the nearby vehicle through relatively simple calculation and control.

When the rider performs an accelerating operation for acceleration or a braking operation for deceleration, the second motor 212 moves the main frame 302 longitudinally to move the simulated motorcycle 300 longitudinally, in which the simulated motorcycle 300 is declined toward the front and the rider feels acceleration or deceleration. When the picture showing a corner of the street is displayed and the rider's weight is shifted, the first motor 208 turns a rolling shaft, not shown, to tilt the simulated motorcycle 300 laterally and, if necessary, the hydraulic cylinder actuator 213 is actuated to raise the main frame 302 in the tilting direction by projecting the piston rod 214. Consequently, the rider experiences temporarily a turning feeling that will be experienced when a real motorcycle corners.

Figure 10:
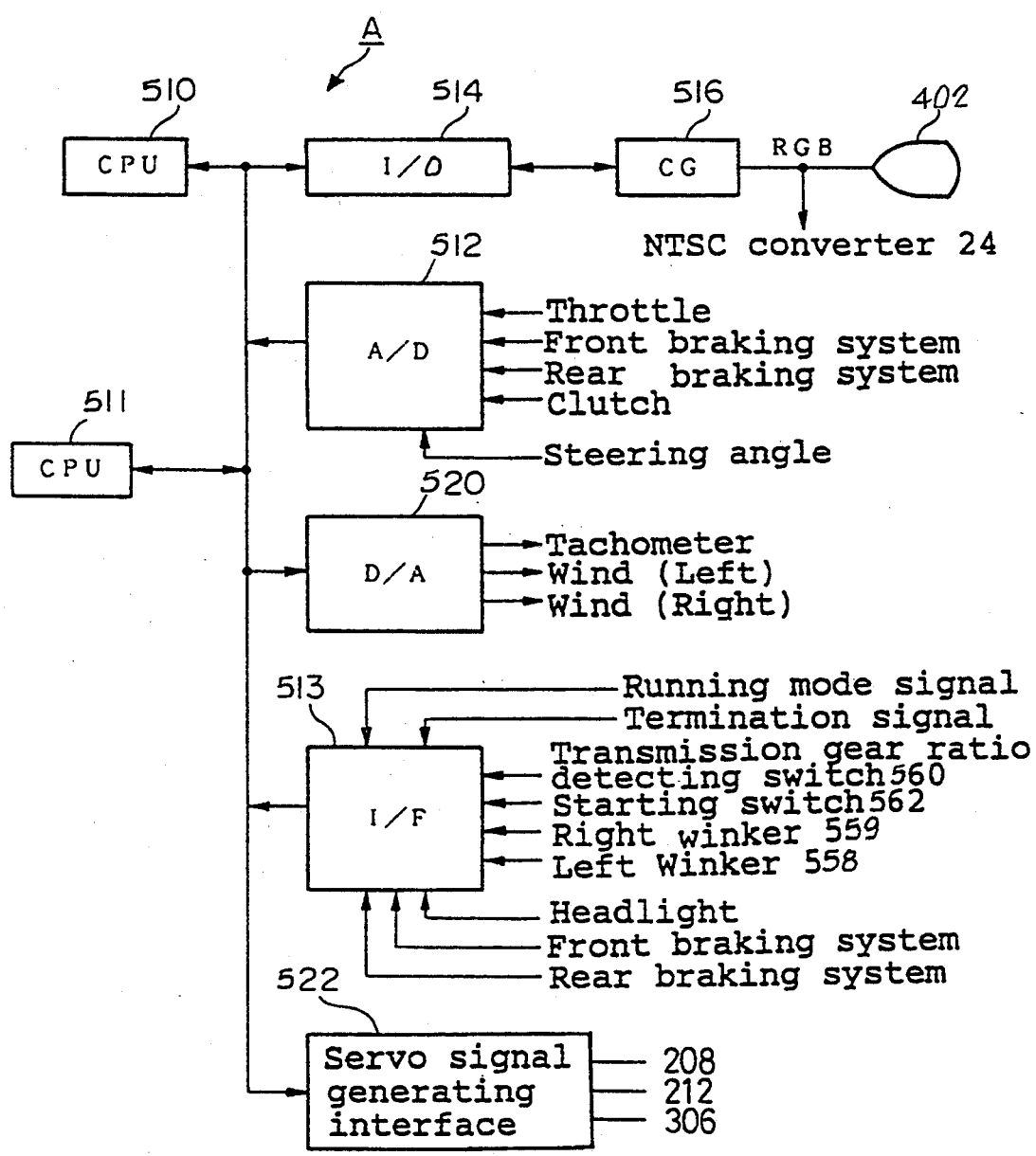
FIG. 10 is a block diagram showing the electrical configuration of a portion of a display/control system included in the riding simulator of FIG. 1.
Figure 11:
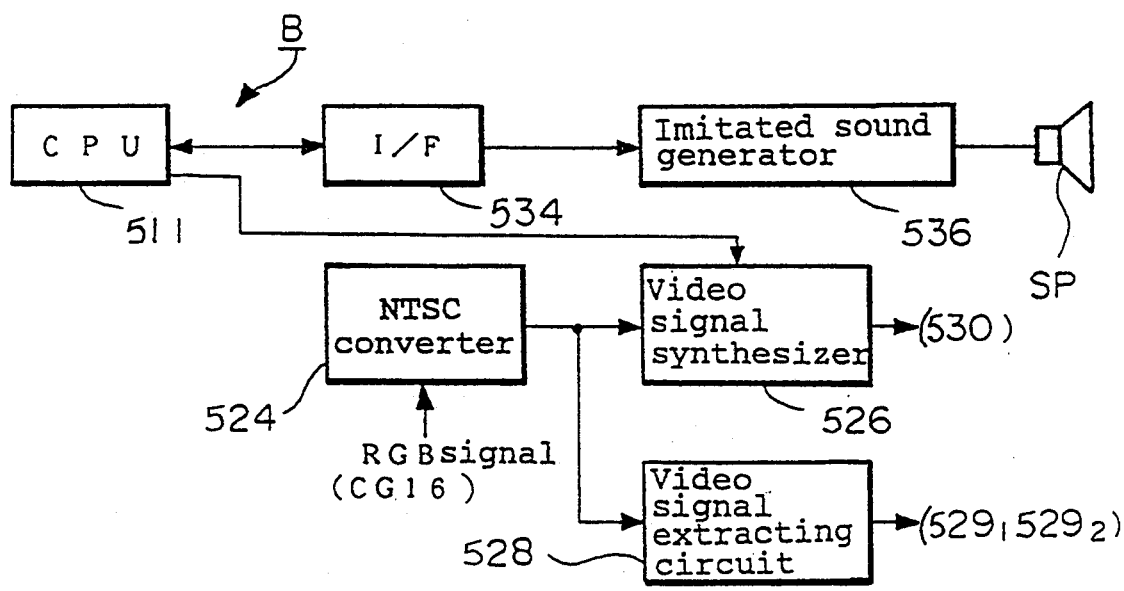
FIG. 11 is a block diagram showing the electrical configuration of a portion of the display/control system.
Figure 12:
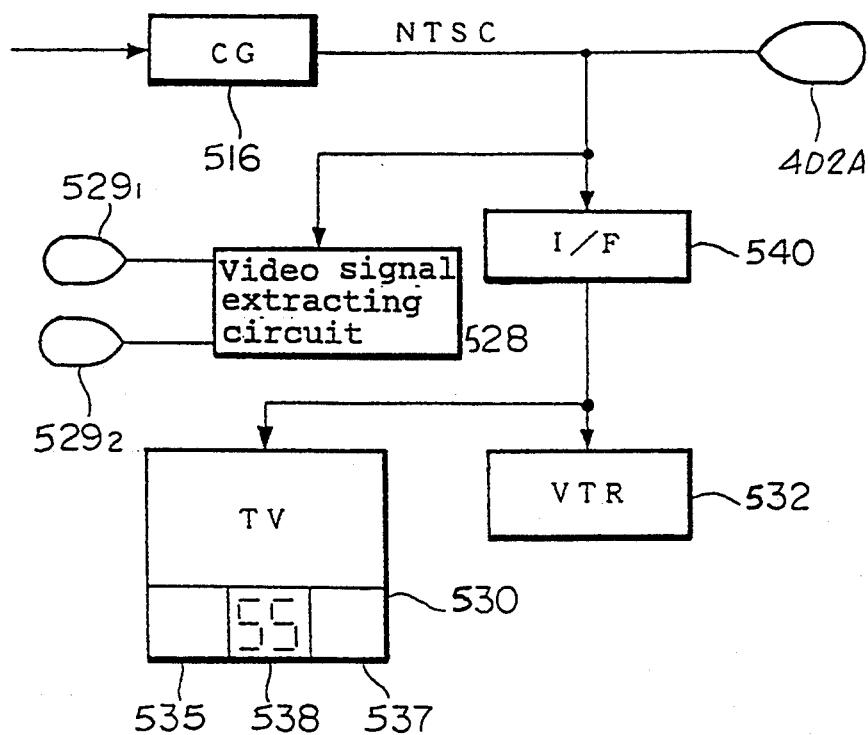
FIG. 12 is a block diagram showing the electrical configuration of a portion of the display/control system.

Referring to FIGS. 10 to 12, the display/control system comprises a display/control unit A for displaying a picture of a scenery within the rider's field of vision and controlling the simulated motorcycle 300 according to the rider's operating actions, and a display/control unit B for controlling a display for an instructor in cooperation with the display/control unit A.

The display/control unit A comprises a CPU 510 connected by a bus to a CPU 511, a color video signal generator 516 which receives information instructing displaying a picture in the rider's field of vision on the basis of control information received through an I/O interface 514 from the CPU 510 and sends red, green and blue video signals (RGB video signals) representing sceneries in front of and behind the rider to the video projector 402, an A/D converter 512 which converts analog operation signals representing the rider's operating actions into corresponding digital signals and gives the digital signals to the CPU 510, an D/A converter 520 which converts running speed information representing the running speed of the simulated motorcycle and sound information representing the sound generated by the simulated motorcycle provided by the CPU 510 into corresponding analog signals, an input interface 513 which receives ON/OFF signals provided by rider's operating actions and an operation termination signal provided by the instructor's operating action and sends corresponding information to the CPU 510, and a servo signal generating interface 522 which receives motor control signals from the CPU 510 and provides motor control signals for controlling the first motor 208, the second motor 212 and the third motor 306.

Eventually, the CPU 510 carries out signal input and output operations, an arithmetic operation for determining the position running direction and attitude of the simulated motorcycle on the basis of signals corresponding to the rider's operating actions, a control operation for controlling the display system, a control operation for controlling the attitude of the simulated motorcycle, a control operation for controlling the condition of a nearby vehicle, and a grading operation for grading the rider's motorcycle operating skill.

The analog operation signals given to the A/D converter 512 include a steering angle signal representing an angle through which the handlebar 308 is turned, a throttle position signal representing the angular position of the throttle grip, a front braking lever position signal, a rear braking lever position signal and a clutch lever position signal, which are detected, for example, by position sensors combined respectively with the handlebar 308, the clutch lever 316, the front braking system 312 and the rear braking system 314. Rotary encoders may be employed instead of the position sensors. When rotary encoders are employed instead of the position sensors, the A/D converter 512 may be omitted and detection signals provided by the rotary encoders may be given to the input interface 513.

The input interface 513 receives a running mode signal, a starting signal, a transmission gear ratio signal representing a selected gear ratio of the transmission, such as the first speed, second speed or the like, a right winker actuation signal, a left winker actuation signal and an operation termination signal. These signals are provided by a running mode selector switch, the starting switch 562, a transmission gear ratio detecting switch 560, a right winker switch 559, a left winker switch 558, a front braking system operation switch, a rear braking system operation switch, a headlight switch 320, and a operation instructing switch operated by the instructor.

The color video signal generator 516 is connected to an external storage device storing three-dimensional image data for a plurality of running modes, representing front sceneries in the rider's field of vision, i.e., sceneries spreading before the simulated motorcycle, and three-dimensional image data for the plurality of running modes, representing rear sceneries including nearby vehicles to be reflected on the rearview mirrors.

The color video signal generator 516 reads the three-dimensional image data from the external storage device according to running mode information provided through the I/O interface 514 by the CPU 510, processes the three-dimensional image data, generates color video signals, sends the color video signals to the display system to display pictures represented by the color video signals.

The servo signal generating interface 522 drives the first motor 208, the second motor 212 and the third motor 306 according to control signals received from the CPU 510 to control the attitude of the simulated motorcycle and the resistance against the operation of the handlebar 308.

The display/control unit B comprises the CPU 511 connected to the CPU 510 by a bus, an imitation sound generator 536 which drives a loudspeaker SP according to an imitation sound control signal given thereto through an interface 534 to generate imitation sounds surrounding the simulated motorcycle during simulated running, a NTSC converter 524 for converting the RGB video signals provided by the color video signal generator 516 into corresponding color video signals of the NTSC system, a video signal synthesizer 526 which synthesizes video signals based on a transmission gear ratio signal, a running speed signal representing the running speed of the simulated motorcycle, a right winker actuation signal, a left winker actuation signal, a front braking system operation signal, a rear braking system operation signal and running speed information representing the running speed of the simulated motorcycle provided by the CPU 510, and the color video signals provided by the NTSC converter 524, and a video signal extracting circuit 528 which extracts color video signals representing pictures to be reflected on the rearview mirrors from the color video signals provided by the NTSC converter 524.

Color video signals synthesized by the video signal synthesizer 526 are applied to a monitoring display through an interface 540 to display a color picture of a scenery in the rider's field of vision. The running speed of the simulated motorcycle, the selected gear ratio of the transmission, the condition of the right and left winkers, and the condition of the front and rear braking systems are indicated in a speed indicating area 538 formed at the middle of the lower portion of the screen of the monitoring display 530. Images of sceneries reflected on the right and left rearview mirrors are displayed in a right display area 537 and a left display area 534 on the right-hand side and left-hand side of the speed indicating area 538, respectively. The color video signals for the right display area 537 extracted from the color video signals by the video signal extracting circuit 528 are given to a liquid crystal display $529_1$, disposed at a position corresponding to that of the right rearview mirror, the color video signals for the left display area 535 are given to a liquid crystal display $529_2$ disposed at a position corresponding to that of the left rearview mirror, and scenery behind the simulated motorcycle is displayed on the liquid crystal displays $529_1$, and $529_2$. The color video signals provided by the video signal synthesizer 526 are recorded on a video signal recording medium by video signal recorder 532.

The imitation sound generator 536 may be driven to generate imitation sounds that may be generated by the simulated motorcycle running at the running speed by the imitation sound control signal including an imitation sound signal varying according to the running speed of the simulated motorcycle. In such a case, the DA converter 520 need not provide any sound information representing sounds that may be generated by the simulated motorcycle.

Figure 13:
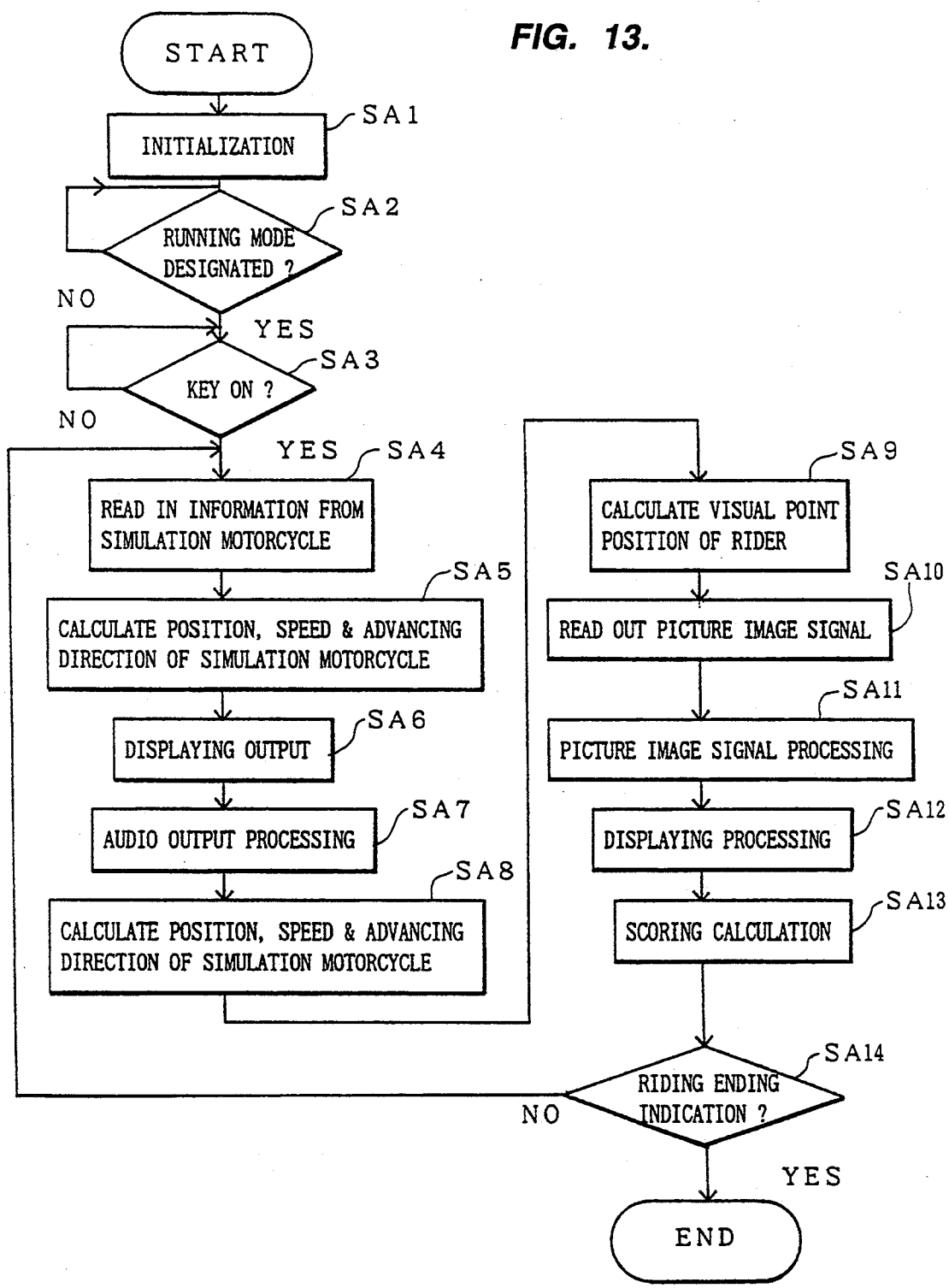
FIG. 13 is a flow chart of a main control program to be executed by the display/control system.

Looking to the flow chart shown in FIG. 13, first, the program is started and the simulated simulator is initialized in step SA1, signals are read through the input interface 513 and a query is made in step SA2 to see if any running mode among, for example, a normal traffic running mode for running on a street in a normal traffic condition, a congested traffic running mode for running on a street in a congested traffic condition, and a dangerous running mode for running on a street in a dangerous traffic condition, is specified. Three-dimensional image data representing sceneries for those running modes is stored in the external storage device, such as a CD-ROM, connected to the color video signal generator 516. A running mode is specified by the instructor.

When a running mode is specified, the three-dimensional image data for the specified running mode is transferred to and stored temporarily in a RAM included in the color video signal generator 516. Then, a query is made in step SA3 to see if a start signal has been given through the input interface 513. When the start signal is given, the output signals of the A/D converter 512 and the input interface 513 about the simulated motorcycle are read and stored in the internal storage device of the CPU 510 in step SA4.

Then, in step SA5, the position, running speed and running direction of the simulated motorcycle are determined on the basis of the information stored in the internal storage device of the CPU 510 including a steering angle signal, a throttle position signal, a front braking lever position signal, a rear braking lever position signal and a clutch position signal. Running sound data corresponding to the calculated running speed data is read from the storage device, converted into corresponding analog signals and the right and left loudspeakers SP are driven to generate running sounds in step SA6. Running speed data corresponding to the calculated running speed data is read from the storage device and converted into corresponding analog signals, and the speed meter included in the simulated motorcycle is driven by the analog signals to indicate the running speed of the simulated motorcycle in step SA7.

Subsequently, resistance against steering, the attitude of the simulated motorcycle, i.e., the roll and pitch of the simulated motorcycle, are calculated on the basis of the signals read in step SA4. Signals representing the calculated resistance against steering, the calculated roll and the calculated pitch are set to the servo signal generating interface 522 (FIG. 10), and then the third motor 306, the first motor 208 and the second motor 212 are driven to apply a resistance against the rider's steering action to the simulated motorcycle and the simulated motorcycle is caused to pitch and roll.

Thus, the rider needs to exert a steering force equal to that necessary for steering a real motorcycle on the handlebar, experiences pitching and rolling motions that will be experienced on the real motorcycle and hears wind noise.

In step SA9, the position of the rider's visual point is calculated on the basis of results of calculation executed in steps SA5 and SA8, and running mode information about the specified running mode and the calculated visual point data representing the position of the rider's visual point are sent through the I/O interface 514 to the color video signal generator 516, and then the three-dimensional image data for the specified running mode stored in the RAM of the color video signal generator 516 is read out in step SA10 and processed in step SA11 according to the calculated visual point data representing the position of the rider's visual point.

In the processing according to the visual point data, the coordinate axes of the displayed picture are turned according to the pitch and roll of the simulated motorcycle and the picture is varied according to the variation of the position of the rider's visual point varying at a rate corresponding to the running speed of the simulated motorcycle. Then, RGB video signals obtained by processing the three-dimensional image signals in step SA11 are given to the video projector 402 in step SA12.

The RGB video signals represent, for example, a picture obtained by cutting out the central portion of a section b, which corresponds to the speed indicating area 38 in the screen of the monitoring display 530, of a picture shown in FIG. 9(A). Upon the reception of the RGB video signals, the video projector 402 projects light signals to display a picture as shown in FIG. 9(A). The light signals projected by the video projector 402 is reflected by the primary reflector 404 and the second reflector 406 on to the flat screen 408 disposed substantially perpendicularly to a plane including the rider's line of vision. When displaying the picture represented by the RGB video signals, the portion b, which corresponds to the picture to be displayed in the speed indicating area 38, of the picture shown in FIG. 9(A) is masked optically.

Consequently, only a section a of the picture shown in FIG. 9(A) is displayed on the flat screen 408 and the rider views the picture through the Fresnel lens 410. Since the rider views the picture through the Fresnel lens 410, the rider's eyes are focused on a remote point even if the rider's visual point is relatively near to the flat screen 408. Accordingly, the rider is able to view the picture of a scenery displayed on the nearby flat screen 408 with a sense of perspective substantially the same as that experienced when riding on a real motorcycle for actual running.

Since the Fresnel lens 410 condenses light rays scattered by the flat screen 408, the picture is bright. Since the Fresnel lens 410 is declined toward the rider, the magnification of the picture increases toward the lower portion of the picture, so that the enlarged lower portion of the picture looks like moving rapidly; that is, the lower portion of the picture showing the scenery spreading before the rider moves more rapidly than the upper portion of the picture, so that picture is able to make the rider experience a sense of running substantially equal to that will be experienced during actual running.

The picture of the scenery spreading before the simulated motorcycle, i.e., the scenery in the rider's field of view, is regulated according to the variation of the position of the rider's visual point and, the picture is turned according to the variation of the attitude of the simulated motorcycle. Thus, the rider experiences the variation of the scenery substantially corresponding to that of the scenery that will be experienced when actually riding a real motorcycle. Meantime, the imitation sound generator 536 generates imitation sounds on the basis of the imitation sound signals provided by the CPU 511 to provide substantially lifelike imitations of various ambient sounds for the rider.

The NTSC converter 524 converts the RGB video signals into color video signals. The color video signals provided by the NTSC converter 524, and signals provided by the CPU 511 indicating the selected gear ratio of the transmission, the condition of the right and left winkers, the condition of the front and rear braking systems and the running speed of the simulated motorcycle are synthesized by the video signal synthesizer 526. The video signal synthesizer 526 gives synthesized color video signals to the monitoring display 530 to display a picture reflecting the present running condition of the simulated motorcycle. The picture shown in FIG. 9(A) is an example of a picture for a normal traffic running mode for running on a street in a normal traffic condition.

A picture in the rider's field of vision is displayed in a section a of the screen of the monitoring display 530, pictures of sceneries to be reflected on the right and left rearview mirrors are displayed in the right-hand and left-hand portions of the section b, and the running speed of the simulated motorcycle, the selected gear ratio of the transmission, the condition of the right and left winkers and the condition of the front and rear braking systems are indicated in the speed indicating area 538, from which the instructor judges the rider's operating condition.

The color video signals converted by the NTSC converter 524 are given also to the video signal extracting circuit 528. The video signal extracting circuit 528 extracts video signals representing pictures of sceneries behind the simulated motorcycle to be reflected on the rearview mirrors, and gives the extracted video signals to the liquid crystal displays $529_1$, and $529_2$ to display the pictures of the sceneries behind the simulated motorcycle to be reflected on the rearview mirrors on the liquid crystal displays $529_1$ and $529_2$. The liquid crystal displays $529_1$, and $529_2$ are disposed at positions where the rearview mirrors of the simulated motorcycle are to be disposed to enable the rider to view the sceneries behind the simulated motorcycle varying as the simulated motorcycle runs. The pictures displayed on the liquid crystal displays $529_1$, and $529_2$ vary in a mode in which sceneries reflected actually on the real rearview mirrors vary. The synthesized video signals provided by the video signal synthesizer 526 are given also to the video signal recorder 532 for recording. The recorded synthesized video signals are reproduced after the riding exercise to enable the instructor to explain problems in the rider's method of operating the motorcycle with reference to reproduced synthesized video signals.

After the process in step SA12 has been completed, a grading operation is executed in step SA13 to grade the rider's motor-cycle operating skill. The steps SA4 through SA13 are repeated until an operation end command is given. FIG. 9(B) shows a picture of a scenery as viewed by the rider when the simulated motorcycle is about to enter the intersection, by way of example. When grading the rider's motorcycle operating skill in step SA13, data representing the rider's motorcycle operating skill in dealing with predetermined subjects including the adjustment of the distance between the simulated motorcycle and the nearby vehicle, braking timing and operations to be performed at the intersection is compared with criteria and the grading calculation is carried out on the basis of the results of comparison.

After the grading calculation has been completed, a query is made in step SA14 to see if the operation end command is given. The steps SA4 through SA13 are repeated until the response in step SA14 becomes affirmative.

Control to be executed by the computers when the simulated motorcycle 300 simulates straight running and curvilinear running will be described hereinafter with reference to flow charts shown in FIGS. 14 to 16.

Referring to FIG. 1, the rider starts the simulated motorcycle after data representing the characteristics of the simulated motorcycle has been set in step SB1. In step SB2, signals relating to operations are entered and detected. Then, the program advances through step SB3 to step SB4. In the step SB4, a straight running data calculating process is executed to calculate data representing the running mode of the simulated motorcycle including acceleration or deceleration G, straight running speed X, pitch P, vertical movement Z, engine speed Ne, front wheel rotating speed Nf and rear wheel rotating speed Nr according to a predetermined program stored beforehand in the ROM, not shown, of the CPU 510. When calculating the data representing the running mode of the simulated motorcycle, input data including throttle opening, the stroke of the clutch, a selected gear ratio of the transmission, the braking pressure of the front braking system and the braking pressure of the rear braking system, and predetermined data representing the characteristics of the simulated motorcycle including the output torque characteristics of the engine, braking characteristics, slip ratio of the wheels, reduction ratio, air resistance, rolling resistance, the characteristics of the suspension system, the moment of inertia and weight of the body, the position of the center of gravity of the simulated motorcycle and the like are used.

After the straight running data calculating process has been completed, a running speed limiting procedure is executed in step SB5. FIGS. 15 and 16 show the flow charts of the running speed limiting procedure. FIG. 15 shows a flow chart of a low-speed running mode simulating procedure and FIG. 16 shows a flow chart of a high-speed running mode simulating procedure.

Figure 15:
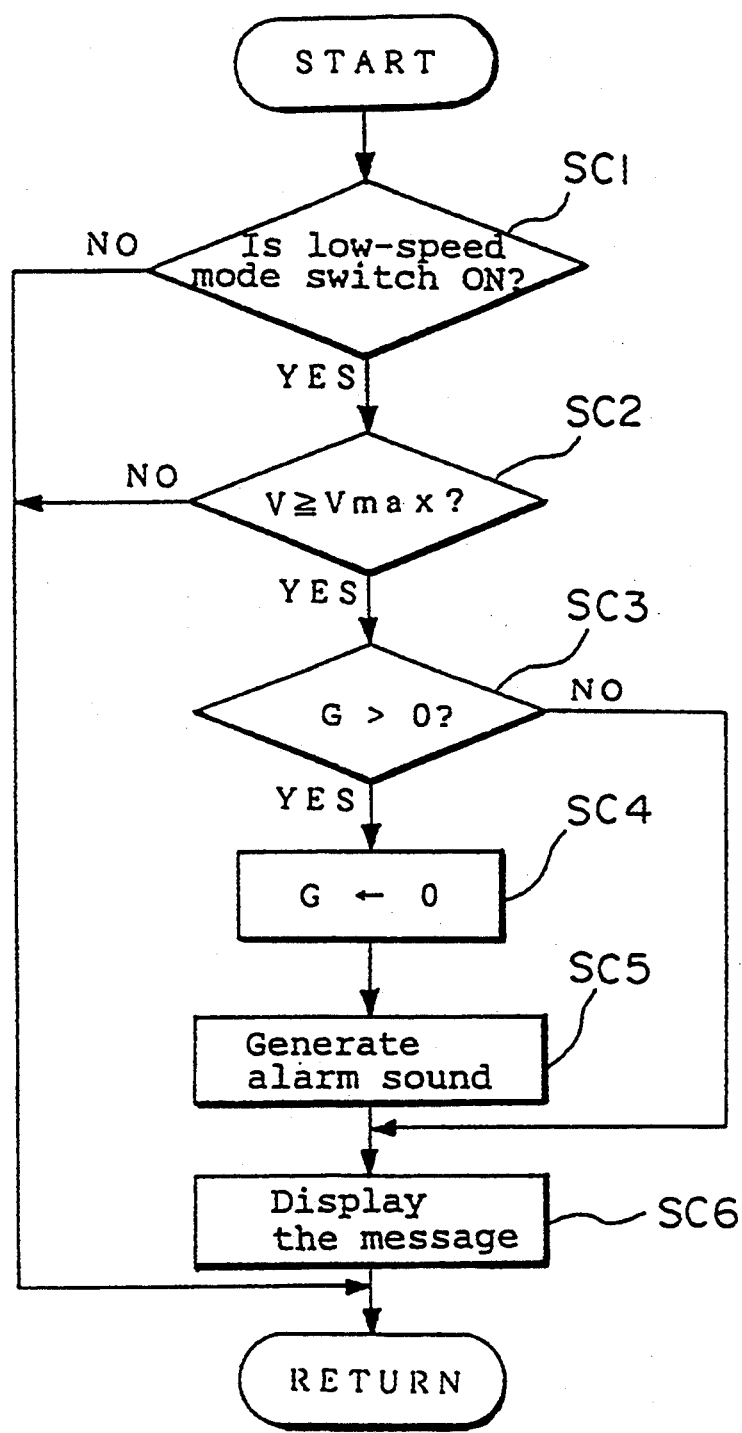
FIG. 15 is a flow chart of part of a running speed limiting procedure included in the straight running data calculating procedure of FIG. 14.
Figure 16:
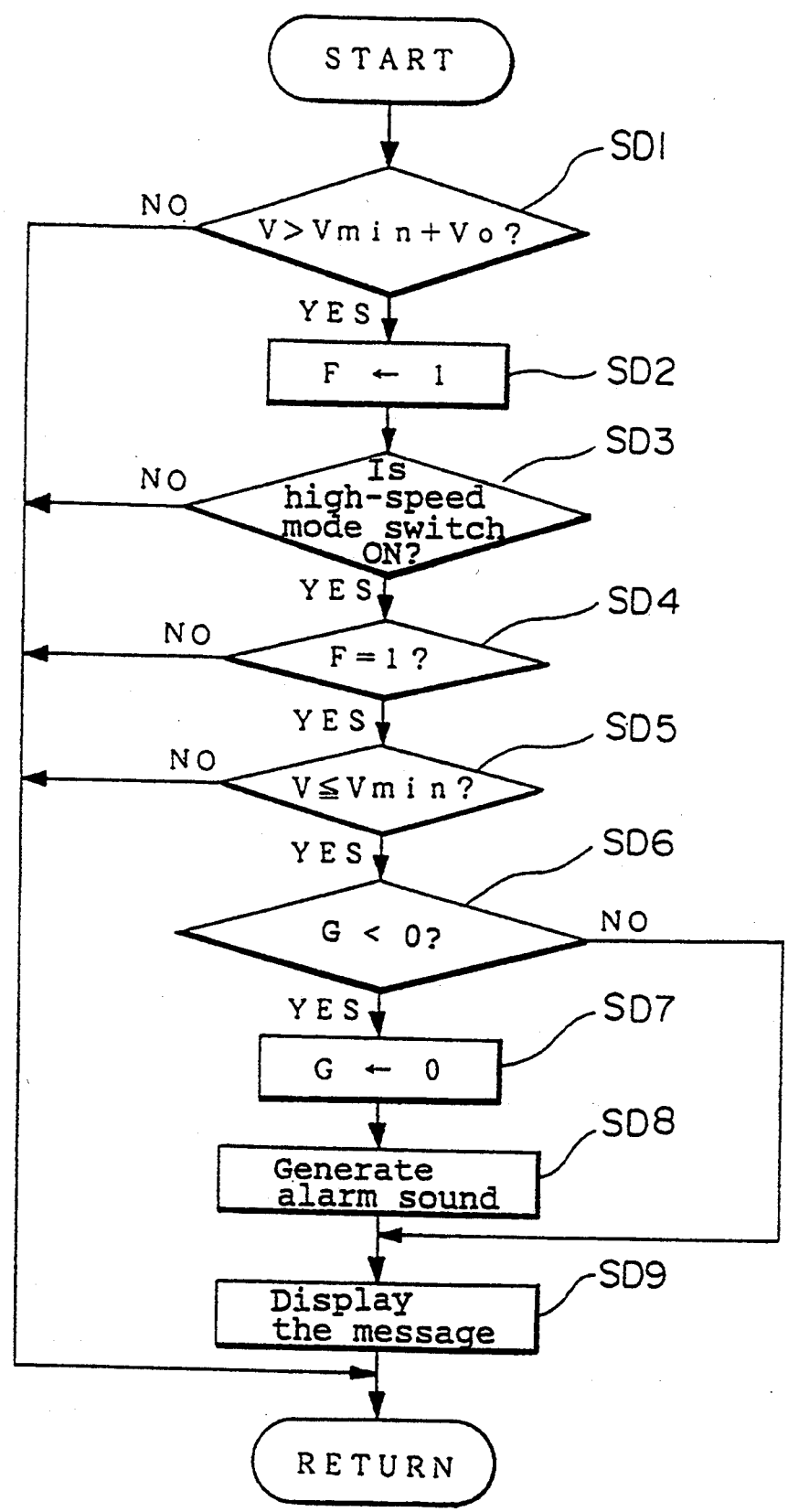
FIG. 16 is a flow chart of part of the running speed limiting procedure included in the straight running data calculating procedure of FIG. 14.

Referring to FIG. 15, a query is made in step SC1 to see if the low-speed mode switch, not shown, is closed. If the response in step SC1 is affirmative, a flag for indicating the condition of the low-speed mode switch is set to "1". Then, a query is made in step SC2 to see if the running speed V of the simulated motorcycle is equal to or higher than a predetermined upper limiting running speed $V_{max}$ (for example, 60 km/hr). If the response in step SC2 is affirmative, a query is made in step SC3 to see if the acceleration G is zero. If the simulated motorcycle is being accelerated after its running speed has exceeded the upper limiting running speed $V_{max}$, the response in step SC is affirmative. Then, in step SC4, the acceleration is reduced forcibly to zero, and an alarm sound is generated in step SC5 to warn the rider that the running speed is about to exceed the upper limiting running speed $V_{max}$. Subsequently, a message telling that the running speed of the simulated motorcycle is about to exceed the upper limiting running speed $V_{max}$ is displayed on the flat screen by the video projector. If the response in step SC3 is negative, i.e., if the running speed V of the simulated motorcycle has reached the upper limiting running speed $V_{max}$ and the simulated motorcycle is not accelerated, the alarm sound is not generated and the control jumps to step SC6, in which the same message is displayed. Thus, the rider is able to realize that the running speed of the simulated motorcycle is about to exceed the upper limiting running speed from the alarm sound and the message. When the low-speed mode switch is not closed or when the running speed of the simulated motorcycle is below the upper limiting running speed, steps SC5 and SC6 are not executed.

A running speed limiting procedure in a high-speed running mode will be explained with reference to the flow chart shown in FIG. 16. In step SD1, a query is made to see if the running speed V of the simulated motorcycle is higher than the addition of a lower limiting running speed $V_{min}$ and a predetermined running speed $V_0$. If the response in step SD1 is affirmative, a flag F is set to "1" in step SD2. When starting the riding simulator, the flag F is reset to "0". Then, in step SD3, a query is made to see if a high-speed running mode switch is closed, i.e., if the flag F for indicating the condition of the high-speed running mode switch is set to "1". If the response in step SD3 is affirmative, a query is made in step SD4 to see if the flag F is "1". Then, in step SD5, a query is made to see if the running speed V of the simulated motorcycle is equal to or below the lower limiting running speed $V_{min}$. If the response in step SD5 is affirmative, a query is made in step SD6 to see if the acceleration G is smaller than Zero; that is, a decision is made as to whether or not the running speed V is not higher than the lower limiting running speed $V_{min}$ and whether or not the simulated motorcycle is decelerated. If the response in step SD6 is affirmative, the negative acceleration G, i.e., deceleration, is increased forcibly to zero in step SD7, an alarm sound is generated in step SD8 to warn the rider that the running speed V is lower than the lower limiting running speed V and the simulated motorcycle is in min deceleration, and a message telling such a running condition is displayed on the flat screen by the video projector in step SD9. If the response in step SD6 is negative, i.e., if the acceleration is equal to or higher than zero, the control jumps to SD9 to display the same message. If all the responses in steps SD1, SD3, SD4 and SD5 are negative, the steps SD8 and SD9 are not executed.

Figure 14:
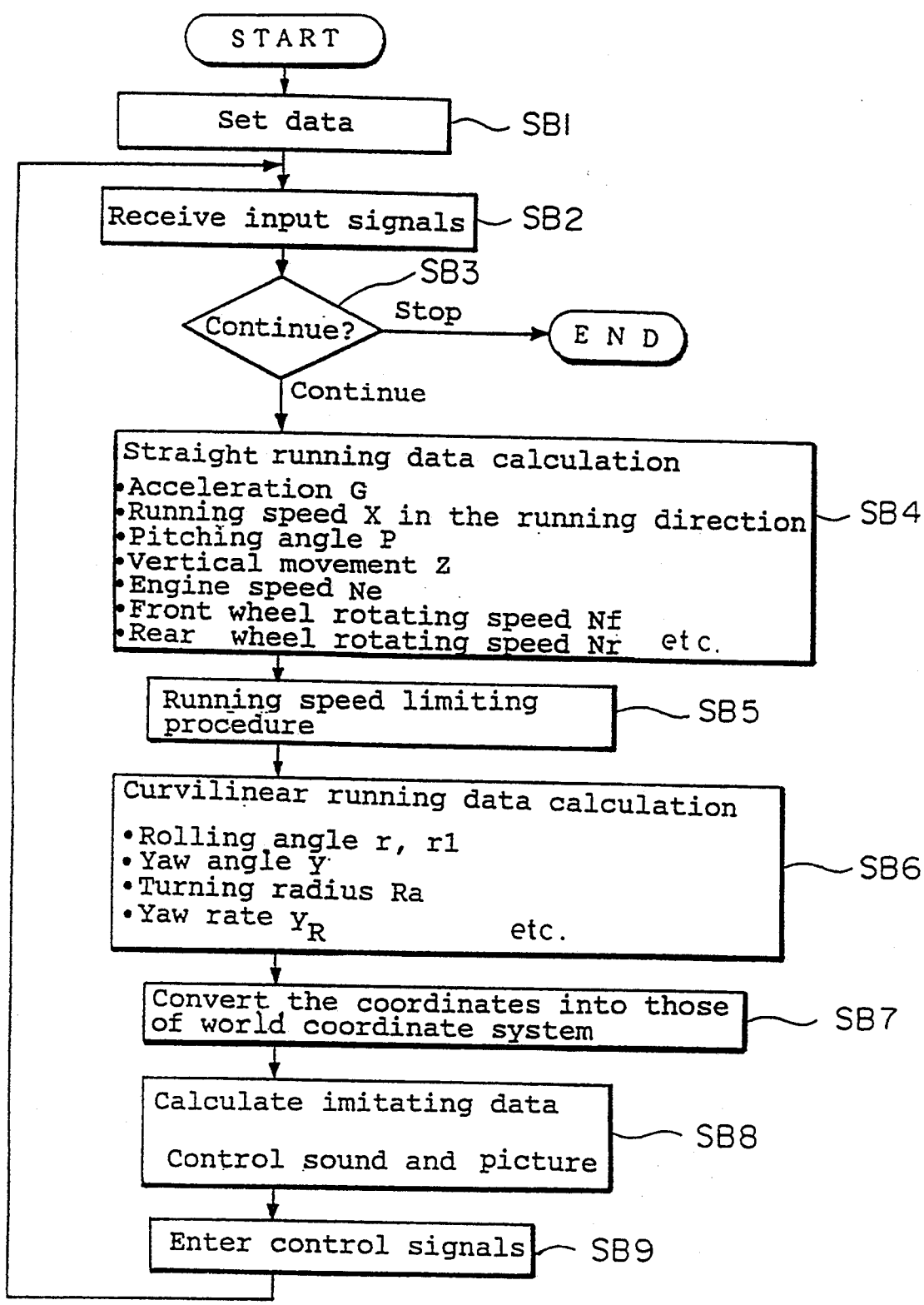
FIG. 14 is a flow chart of a straight running data calculating procedure to be executed by the riding simulator.
Figure 17:
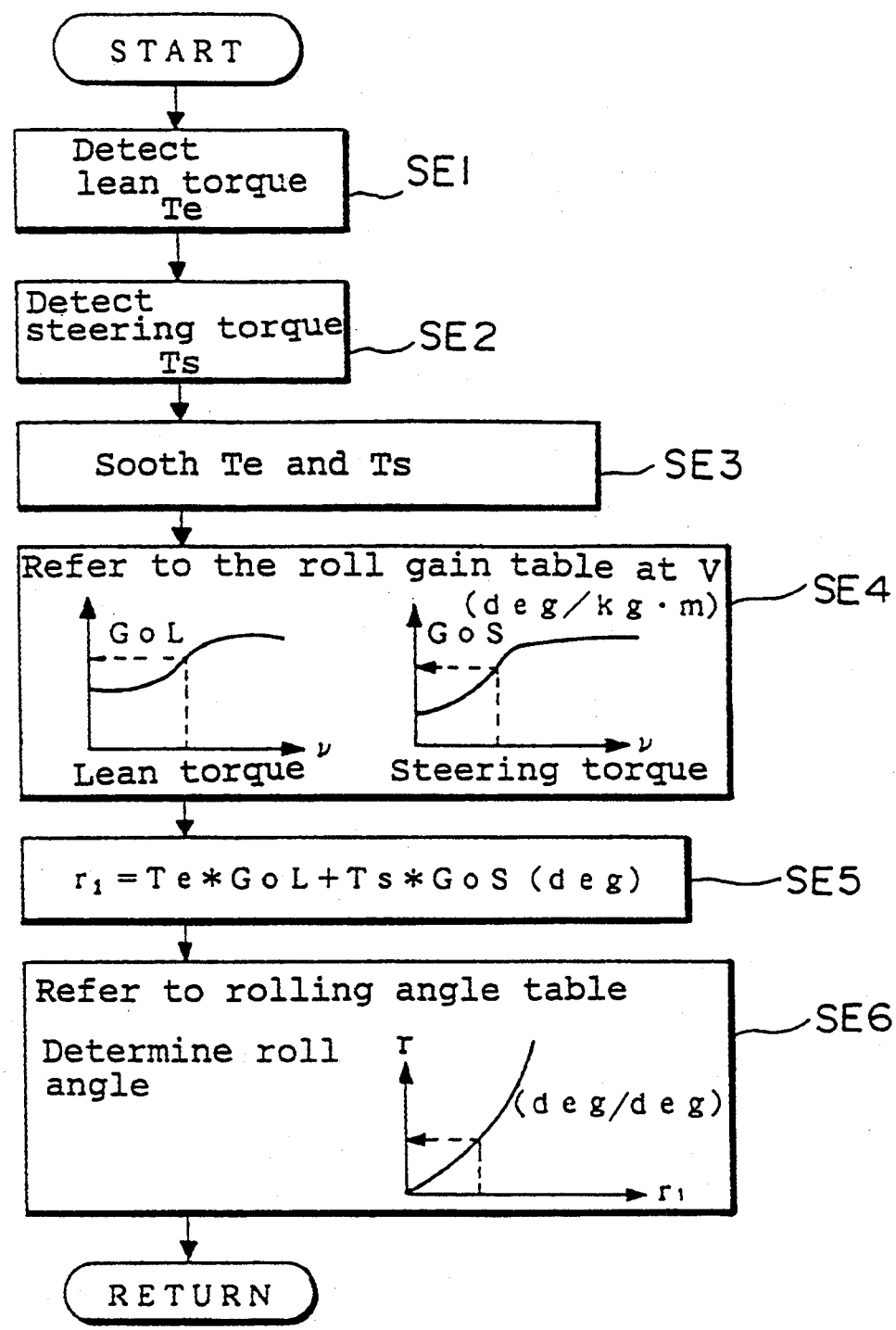
FIG. 17 is a flow chart of a curvilinear running data calculating procedure to be executed by the riding simulator.

After the running speed limiting procedure has been completed, the control returns to step SB6 of FIG. 14 to execute a curvilinear running data calculating procedure expressed by a flow chart shown in FIG. 17. The lean torque Te and steering torque Ts of the simulated motorcycle are detected respectively in steps SE1 and SE2.

As is generally known, the rider's weight is shifted on the motorcycle in order to change the running direction of the motorcycle. That is, the handlebar is operated and, at the same time, the rider's weight is shifted to control the motorcycle for curvilinear running, i.e., cornering. The riding simulator of the present invention is provided with a lean torque sensor for detecting the shift of the rider's weight, in addition to a sensor for detecting steering operation. The lean torque sensor is, for example, comprises load cells that measure the variation of pressure applied thereto resulting from the shift of the rider's weight and send electric signals to the CPU 510.

An input steering signal, i.e., a signal representing the steering operation, may be a steering angle through which the handlebar is turned or a steering force that acts on the handlebar. The riding simulator uses the steering force detected by the steering torque sensor as an input steering signal and calculates the steering angle on the basis of the steering force.

In step SE3, the lean torque Te and the steering torque Ts are subjected to smoothing to eliminate noise components from the lean torque Te and the steering torque Ts. In step SE4, reference is made with a roll gain table stored beforehand in a storage device, and then roll angle r1 (degree) is calculated by using an expression (1) in step SE5.

$$r1 = Te*GoL + Ts*GoS \qquad (1)$$

In step SE6, the calculated roll angle r1 is corrected by using a roll angle correction table to determine a roll angle r through which the simulated motorcycle is actually rolled. Coordinates (Xn, Yn) indicating a running position of the simulated motorcycle is determined by calculation. Refer to Japanese Patent Application No. 2-158939 for the details of the running position calculating procedure.

Then, in step SB7 (FIG. 14), the coordinates (Xn, Yn) is converted into world coordinates (Xo, Yo) in a world coordinate system. The world coordinates correspond to the data of a world map stored beforehand in a storage device and a scenery in the world map. The video projector displays a picture of the scenery on the basis of the present world coordinates. In step SB8, imitating quantities and moving quantities for controlling the picture are calculated and sound signals are produced. In step SB9, the calculated control signals are entered, and actions of the simulated motorcycle and the displayed picture are controlled on the basis of the control signals.

Figure 18:
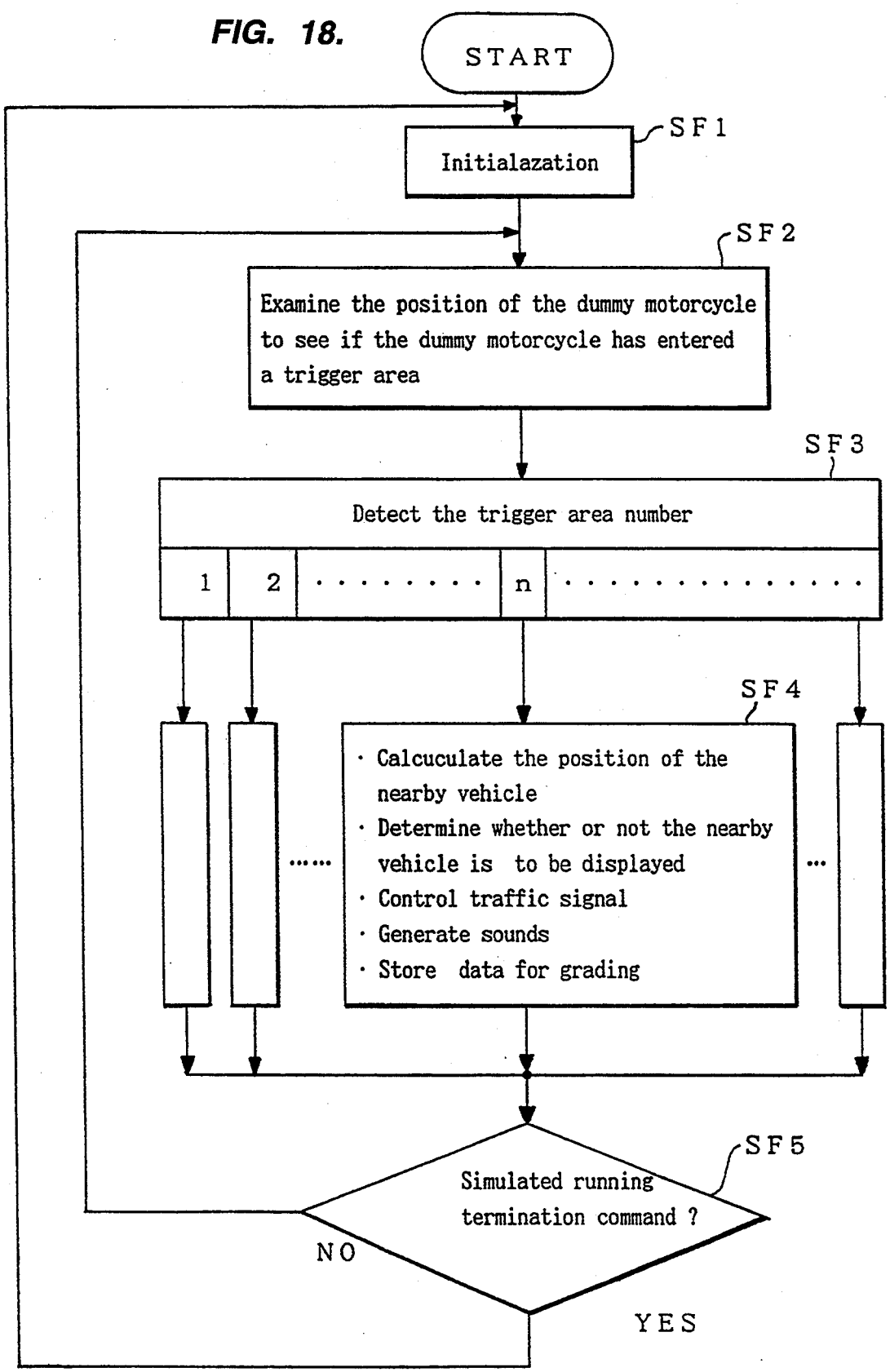
FIG. 18 is a flow chart of a trigger area simulating procedure.
Figure 19:
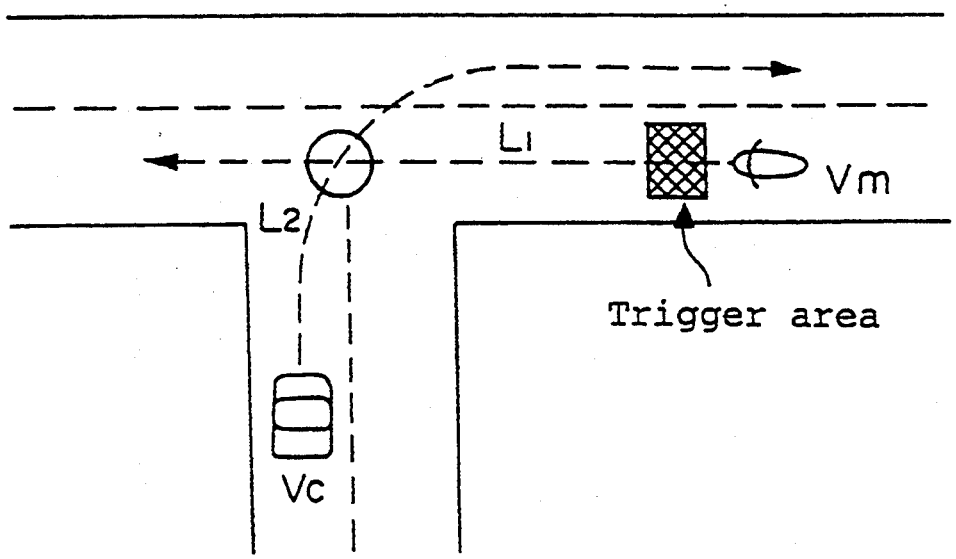
FIG. 19 is a pictorial view simulating the collision of the simulated motorcycle and a nearby vehicle.

Looking to FIG. 18, a program for controlling the procedures is executed principally by the CPU 511. Data and registers are initialized in step SF1, and the position data representing the present position of the simulated motorcycle is examined in step SF2 to see if the simulated motorcycle has entered a predetermined trigger area. A road map represented by map data stored beforehand in the CD-ROM, corresponding to pictures to be displayed, has a plurality of trigger areas for hazard avoidance training. FIG. 19 shows an example of a trigger area. When the simulated motorcycle enters a trigger area, the following procedure is executed. The plurality of trigger areas are identified by trigger area numbers detected in Step SF3.

Upon the entrance of the simulated motorcycle into a trigger area, the trigger area number of the trigger area is found and a procedure specified by the trigger area number is executed. When the simulated motorcycle enters a trigger area No. n, a procedure for the trigger area No. n is executed in step SF4, in which the position of a nearby vehicle is calculated, a decision as to whether or not the nearby vehicle needs to be displayed on the flat screen is made, traffic signals included in the displayed picture are controlled, generation of sound signals is controlled, and data for grading the rider's operating actions is collected. Then, a query is made in step SF5 to see if a simulated running termination command has been provided by the CPU 510. The procedure is repeated until the simulated running termination command is given.

A hazard producing procedure for producing a hazardous relation between the simulated motorcycle and the nearby vehicle in the trigger area will be described hereinafter with reference to FIG. 19. The hazard producing procedure is executed automatically upon the confirmation of the entrance of the simulated motorcycle into the trigger area. When the simulated motorcycle enters the trigger area, a nearby vehicle is displayed automatically on the flat screen and the running speed of the nearby vehicle is calculated. The running speed Vc of the nearby vehicle that will cause the collision of the simulated motorcycle and the nearby vehicle is calculated by using:

$$Vc = (L2/L1) \cdot Vm \qquad (2)$$

wherein L1 is the distance between an expected position of collision and the trigger area, L2 is the distance between the expected position of collision and the position of the nearby vehicle, and Vm is the running speed of the simulated motorcycle. When the running speed of the simulated motorcycle is lower than the lower limiting running speed VmL, the running speed Vc of the nearby vehicle is determined by using:

$$Vc = (L2/L1) \cdot VmL \qquad (3)$$

Thus, the hazardous condition is designed so that the simulated motorcycle collides against the nearby vehicle even if the running speed Vm is changed, unless the running course of the simulated motorcycle is changed. Thus, a virtual collision or the like is produced on the picture for the effective training of the rider for hazard avoidance.

Figure 20:
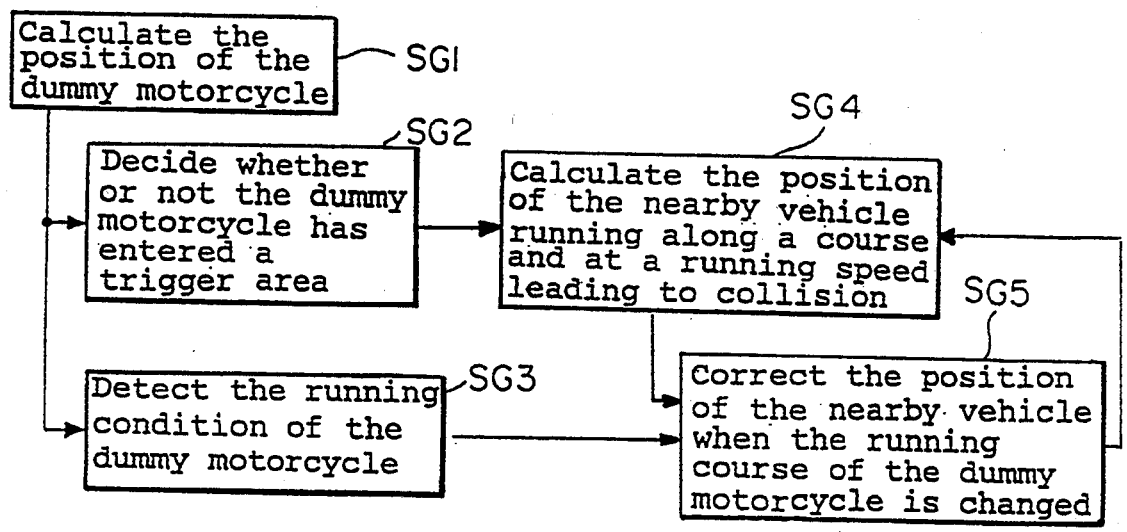
FIG. 20 is a flow chart of a procedure of causing the collision of the simulated motorcycle and the nearby vehicle.

Referring to FIG. 20 showing a procedure of producing a virtual collision, the position of the simulated motorcycle is calculated in step SG1, and the entrance of the simulated motorcycle into the trigger area is detected in step SG2. Meantime, factors indicating the running condition of the simulated motorcycle including running speed, running course and the like are detected in step SG3. In step SG4, a position for the nearby vehicle that will cause collision between the simulated motorcycle and the nearby vehicle is calculated on the basis of the calculated running course and running speed of the simulated motorcycle. If the rider has changed the running course of the simulated motorcycle to avoid an expected hazard, the position of the nearby vehicle is corrected according to the changed running course of the simulated motorcycle in step SG5 so that the collision of the simulated motorcycle and the nearby vehicle will occur. Thus, it is possible to cause the unavoidable collision of the simulated motorcycle and the nearby vehicle unless the simulated motorcycle is stopped.

Figure 21:
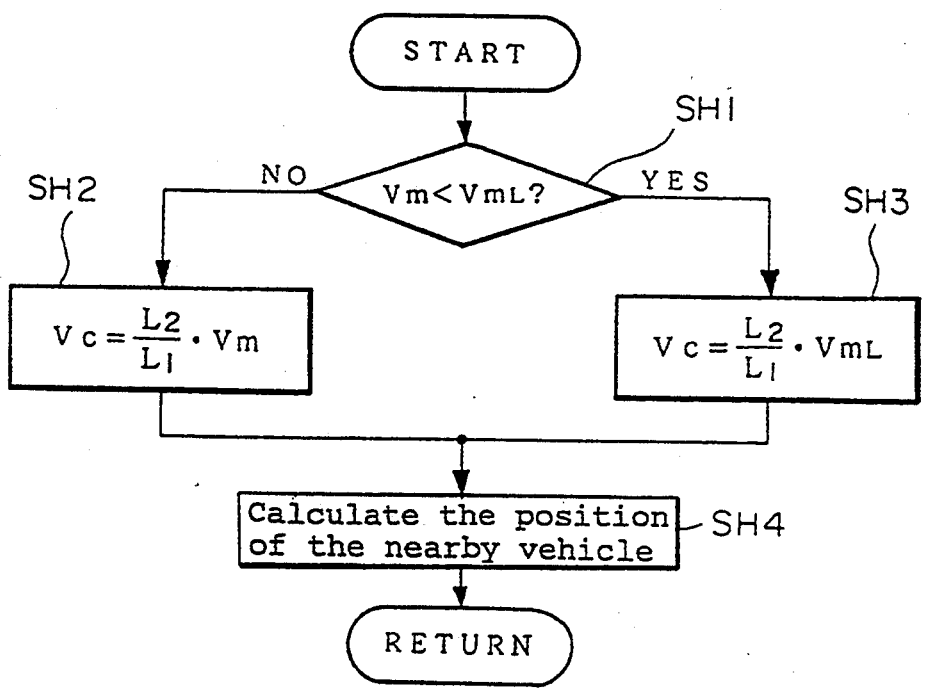
FIG. 21 is a flow chart of a procedure of calculating the running speed and position of the nearby vehicle that will lead to collision.

Referring to FIGS. 21 showing a flow chart of a procedure of calculating the position of the nearby vehicle, a query is made in step SH1 to see if the running speed Vm of the simulated motorcycle is lower than the lower limiting running speed VmL. If the response in step SH1 is affirmative, the running speed Vc of the nearby vehicle is determined in step SH3 by calculation using the expression (3). If the response in step SH1 is negative, namely, if the running speed Vm of the simulated motorcycle is not lower than the lower limiting running speed VmL, the running speed Vc of the nearby vehicle is determined in steps SH2 by calculation using the expression (2). In step SH4, the position of the nearby vehicle is calculated on the basis of the calculated running speed Vc of the nearby vehicle. Such a hazardous condition between the simulated motorcycle and the nearby vehicle can be simulated to enable the rider to experience collision which cannot be experienced through actual exercise.

As is apparent from the foregoing description, a riding simulator for training motorcycle riders capable of controlling pitching and rolling motions of a simulated motorcycle mounted with a rider according to the operating actions of the rider and of displaying a picture that varies according to the operating actions of the rider to simulate actual running condition comprises a running mode selecting means for selecting a specific running mode, a first control means for controlling the behavior of the simulated motorcycle according to a selected specified running mode, and a second control means for controlling a picture corresponding to the running mode by changing the contents of the picture according to the selected specific running mode. Thus, the riding simulator is capable of making the rider experience a specific running modes, such as a low-speed running mode and a high-speed running mode, in connection with the picture for riding training in which the rider is able to experience various conditions which cannot be experience in riding training using a real motorcycle for actual running.

While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A riding simulation system comprising
   a simulation vehicle to be driven by a driver;
   a mount having drives for imparting simulated running behaviors to said simulation vehicle;
   an image projector generating a forward view and a rearward view for the driver;
   a forward display apparatus disposed in front of said simulation vehicle in an opposed relation to said vehicle and positioned to receive said forward view and arranged to mask said rearward view, said forward display apparatus including a screen disposed substantially perpendicularly to a line of sight of the driver and a Fresnel lens provided between said screen and the driver;
   a rearward display apparatus disposed in the position on said simulation vehicle of a rear view mirror and arranged to receive said rearward view.

2. The riding simulation system of claim 1 further comprising
   an image receiving apparatus for receiving and displaying said forward view and said rearward view remote from said simulation vehicle.

3. The riding simulation system of claim 2 further comprising
   a first controller generating a first signal to control said image projector;
   a second controller receiving said rearward view produced by said image projector responsive to said first signal and converting the received rearward view into a second signal and directing said second signal to said image receiving apparatus to display said rear view in synchronism with display of said forward view.

4. The riding simulation system of claim 3 wherein said forward view and said rearward view are outputted simultaneously by said image projector upon said first signal.

5. The riding simulation system of claim 1 wherein said Fresnel lens is at an angle to said screen with a lower portion thereof displaced further from said screen and closer to the driver than the upper portion thereof.

6. A riding simulation system comprising
   a simulation vehicle to be driven by a driver;
   a mount having drives for imparting simulated running behaviors to said simulation vehicle;
   an image projector for generating simulated running images;
   a forward display apparatus disposed in front of said simulation vehicle in an opposed relation to said vehicle and positioned to receive said simulated running images;
   a running mode selector;
   a first controller coupled to said running mode selector and to said mount for controlling the behavior of said simulation vehicle responsive to a selection of said running mode selector;
   a second controller coupled to said running mode selector and to said image projector for controlling said image projector to project the image corresponding to the selection of said running mode selector;
   a simulated speed limiter coupled with said running mode selector, said first controller and said second controller to reduce simulated acceleration to zero upon reaching a simulated speed corresponding to the selection of said running mode selector.

7. The riding simulation system of claim 6 wherein said running mode selector includes a low-speed running mode selection and a high-speed running mode selection.

8. The riding simulation system of claim 6 further comprising a sound generator.

9. A riding simulation system comprising
   a simulation vehicle to be driven by a driver;
   a mount having drives for imparting simulated running behaviors to said simulation vehicle;
   an image projector for generating simulated running images;
   a forward display apparatus disposed in front of said simulation vehicle in an opposed relation to said vehicle and positioned to receive said simulated running images;
   a running mode selector;
   a first controller coupled to said running mode selector and to said mount for controlling the behavior of said simulation vehicle responsive to a selection of said running mode selector;
   a second controller coupled to said running mode selector and to said image projector for controlling said image projector to project the image corresponding to the selection of said running mode selector;
   a simulated speed limiter coupled with said running mode selector, said first controller and said second controller to reduce simulated deceleration to zero upon first exceeding a preselected simulated speed and then upon reaching a minimum simulated speed corresponding to the selection of said running mode selector.

10. A riding simulation system comprising
    a simulation vehicle to be driven by a driver;
    a mount having drives for imparting simulated running behaviors to said simulation vehicle;
    an image projector for generating simulated running images;

a forward display apparatus disposed in front of said simulation vehicle in an opposed relation to said vehicle and positioned to receive said simulated running images;

a running mode selector;

a first controller coupled to said running mode selector and to said mount for controlling the behavior of said simulation vehicle responsive to a selection of said running mode selector;

a second controller coupled to said running mode selector and to said image projector for controlling said image projector to project the image corresponding to the selection of said running mode selector;

a detector for detecting the simulated position of said simulated vehicle on the image and a controller for calculating the relative simulated speed and position of said simulated vehicle to a predetermined simulated hazard presented on the image.

11. The riding simulation system of claim 10 further comprising a calculator for calculating the relative speed of said simulated vehicle to a predetermined simulated hazard presented on the image using the formula: $V_c = (L2/L1) \cdot V_m$, where $V_c$ is the running speed of said simulated hazard, L1 is the distance between the simulated position of said simulated vehicle and a simulated estimated colliding position between said simulated vehicle and said simulated hazard and L2 is the distance between the position of said simulated hazard and the simulated estimated colliding position.

* * * * *